(12) United States Patent
Tan et al.

(10) Patent No.: US 10,333,994 B2
(45) Date of Patent: Jun. 25, 2019

(54) METHOD AND DEVICE FOR IMPROVED MULTI-HOMED MEDIA TRANSPORT

(71) Applicant: Cisco Technology, Inc., San Jose, CA (US)

(72) Inventors: Wai-tian Tan, Sunnyvale, CA (US); Herbert Michael Wildfeuer, Los Altos, CA (US); Xiaoqing Zhu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 165 days.

(21) Appl. No.: 15/347,076

(22) Filed: Nov. 9, 2016

(65) Prior Publication Data

US 2018/0132206 A1   May 10, 2018

(51) Int. Cl.
| | |
|---|---|
| *H04L 29/06* | (2006.01) |
| *H04W 72/00* | (2009.01) |
| *H04W 40/00* | (2009.01) |
| *H04L 12/729* | (2013.01) |
| *H04L 12/727* | (2013.01) |
| *H04L 12/721* | (2013.01) |
| *H04L 12/725* | (2013.01) |
| *H04L 12/707* | (2013.01) |
| *H04W 88/06* | (2009.01) |
| *H04W 84/04* | (2009.01) |
| *H04W 84/12* | (2009.01) |

(52) U.S. Cl.
CPC ........ *H04L 65/1023* (2013.01); *H04L 45/121* (2013.01); *H04L 45/124* (2013.01); *H04L 45/125* (2013.01); *H04L 45/22* (2013.01); *H04L 45/302* (2013.01); *H04L 45/3065* (2013.01); *H04L 65/4015* (2013.01); *H04L 65/80* (2013.01); *H04W 40/00* (2013.01); *H04W 84/042* (2013.01); *H04W 84/12* (2013.01); *H04W 88/06* (2013.01)

(58) Field of Classification Search
CPC . H04W 72/005; H04W 84/042; H04W 88/06; H04L 65/1023
See application file for complete search history.

(56) References Cited

U.S. PATENT DOCUMENTS

| | | | |
|---|---|---|---|
| 6,947,379 B1 * | 9/2005 | Gleichauf | ............... H04L 45/00 370/229 |
| 7,769,002 B2 | 8/2010 | Gong et al. | |

(Continued)

*Primary Examiner* — Edan Orgad
*Assistant Examiner* — Nourali Mansoury
(74) *Attorney, Agent, or Firm* — Merchant & Gould P.C.

(57) ABSTRACT

In one embodiment, a method includes: determining a plurality of candidate paths for a plurality of media streams, where each of the candidate paths is characterized by a first set of performance attributes and each of the plurality of media streams is characterized by a set of stream parameters; jointly determining a respective path from among the plurality of candidate paths that satisfies the set of stream parameters for each of the plurality of the media streams; and coordinating transmission of the plurality of media streams via the jointly determined respective path for each of the plurality of media streams. According to some implementations, the method is performed by a device with one or more processors and non-transitory memory.

13 Claims, 13 Drawing Sheets

(56) References Cited

U.S. PATENT DOCUMENTS

| | | | |
|---|---|---|---|
| 8,045,559 B2* | 10/2011 | Yamada | H04L 45/00 370/228 |
| 8,391,928 B2 | 3/2013 | Karaoguz et al. | |
| 8,838,095 B2 | 9/2014 | Jouin | |
| 2002/0010855 A1* | 1/2002 | Reshef | G06F 21/554 713/164 |
| 2002/0070934 A1* | 6/2002 | Sakamoto | G01C 21/3638 345/419 |
| 2003/0141093 A1 | 7/2003 | Tirosh et al. | |
| 2003/0214582 A1* | 11/2003 | Takahashi | G01C 21/3647 348/116 |
| 2007/0297331 A1* | 12/2007 | Tidwell | H04L 1/0007 370/232 |
| 2009/0165096 A1* | 6/2009 | Hughes | H04L 63/08 726/5 |
| 2010/0217874 A1* | 8/2010 | Anantharaman | H04L 29/12528 709/228 |
| 2011/0158113 A1* | 6/2011 | Nanda | H04L 12/185 370/252 |
| 2012/0136880 A1* | 5/2012 | Williamson | G06F 17/30557 707/756 |
| 2013/0055331 A1* | 2/2013 | Karacali-Akyamac | H04L 65/80 725/116 |
| 2015/0281317 A1 | 10/2015 | Du et al. | |
| 2016/0094465 A1* | 3/2016 | Park | H04L 43/0864 370/235 |

* cited by examiner

Tx/Rx Matrix 200

| | Rx Interface 206A (e.g., WiFi) | Rx Interface 206B (e.g., 3G) |
|---|---|---|
| Tx Interface 204A (e.g., WiFi) | Path 242A with Attributes 202A: $\{R_{AA}, L_{AA}, D_{AA}\}$ | Path 242B with Attributes 202B: $\{R_{AB}, L_{AB}, D_{AB}\}$ |
| Tx Interface 204B (e.g., 3G) | Path 242C with Attributes 202C: $\{R_{BA}, L_{BA}, D_{BA}\}$ | Path 242D with Attributes 202D: $\{R_{BB}, L_{BB}, D_{BB}\}$ |

Path Attributes Table 205

| | |
|---|---|
| $R_{AA}$ | 3 Mbps |
| $L_{AA}$ | 3% |
| $D_{AA}$ | 100 ms |
| $R_{BB}$ | 3 Mbps |
| $L_{BB}$ | 3% |
| $D_{BB}$ | 500 ms |

202A = {$R_{AA}$, $L_{AA}$, $D_{AA}$}
202D = {$R_{BB}$, $L_{BB}$, $D_{BB}$}

Media Stream Parameters Table 215

| | |
|---|---|
| $R_{234}$ | 2 Mbps |
| $D_{234}$ | 2000 ms |
| $R_{238}$ | 2 Mbps |
| $D_{238}$ | 500 ms |

FIG. 2A

Tx/Rx Matrix *300*

| Tx Interface 304A (e.g., WiFi) | Rx Interface 306A (e.g., WiFi) | Rx Interface 306B (e.g., 3G) |
|---|---|---|
| Tx Interface 304A (e.g., WiFi) | Path 342A with Attributes 302A: {$R_{AA}$, $L_{AA}$, $D_{AA}$} | Path 342B with Attributes 302B: {$R_{AB}$, $L_{AB}$, $D_{AB}$} |
| Tx Interface 304B (e.g., 3G) | Path 342C with Attributes 302C: {$R_{BA}$, $L_{BA}$, $D_{BA}$} | Path 342D with Attributes 302D: {$R_{BB}$, $L_{BB}$, $D_{BB}$} |

Path Attributes Table *305*

| 302A | $R_{AA}$ | 2 Mbps, 10% Overhead |
| | $L_{AA}$ | 3%, Isolated |
| | $D_{AA}$ | 100 ms |
| 302D | $R_{BB}$ | 2 Mbps, 10% Overhead |
| | $L_{BB}$ | 3%, Clustered |
| | $D_{BB}$ | 500 ms |

Media Stream Parameters Table *315*

| 334 | $R_{334}$ | 1.5 Mbps, 10% Overhead |
| | $D_{334}$ | 500 ms |
| 338 | $R_{338}$ | 1.5 Mbps, 10% Overhead |
| | $D_{338}$ | 2000 ms |

FIG. 3A

Tx/Rx Matrix 500

|  | Rx Interface 506A (e.g., WiFi) | Rx Interface 506B (e.g., 3G) | Rx Interface 506C (e.g., other) |
|---|---|---|---|
| Tx Interface 504A (e.g., WiFi) | Path 542A with Attributes 502A: $\{R_{AA}, L_{AA}, D_{AA}\}$ | Path 542B with Attributes 502B: $\{R_{AB}, L_{AB}, D_{AB}\}$ | Path 542C with Attributes 502C: $\{R_{AC}, L_{AC}, D_{AC}\}$ |
| Tx Interface 504B (e.g., 3G) | Path 542D with Attributes 502D: $\{R_{BA}, L_{BA}, D_{BA}\}$ | Path 542E with Attributes 502E: $\{R_{BB}, L_{BB}, D_{BB}\}$ | Path 542F with Attributes 502F: $\{R_{BC}, L_{BC}, D_{BC}\}$ |
| Tx Interface 504C (e.g., other) | Path 542G with Attributes 502G: $\{R_{CA}, L_{CA}, D_{CA}\}$ | Path 542H with Attributes 502H: $\{R_{CB}, L_{CB}, D_{CB}\}$ | Path 542I with Attributes 502I: $\{R_{CC}, L_{CC}, D_{CC}\}$ |

Path Attributes Table 505

502A:
| $R_{AA}$ | 5 Mbps |
| $L_{AA}$ | 3% |
| $D_{AA}$ | 100 ms |

502E:
| $R_{BB}$ | 5 Mbps |
| $L_{BB}$ | 3% |
| $D_{BB}$ | 5 ms |

502I:
| $R_{CC}$ | 5 Mbps |
| $L_{CC}$ | 3% |
| $D_{CC}$ | 250 ms |

Media Stream Parameters Table 515

534:
| $R_{534}$ | 4 Mbps |
| $D_{534}$ | 2000 ms |

538:
| $R_{538}$ | 4 Mbps |
| $D_{538}$ | 500 ms |

FIG. 5A

# METHOD AND DEVICE FOR IMPROVED MULTI-HOMED MEDIA TRANSPORT

TECHNICAL FIELD

The present disclosure generally relates to data routing, and in particular, to systems, methods, and devices for jointly determining path-stream pairings.

BACKGROUND

In many situations, it is common to have multiple networks available for media transport at the same time. It is also increasingly common for client devices to have simultaneous access to both wireless Internet Protocol (IP) and cellular networks. Media gateways may also have access to multiple paths or channels for delivery media. Furthermore, the consumption of multiple media streams at one time is not uncommon.

Typical methods that leverage the availability of multiple networks (or multiple paths) include: the selection of a preferred network based on a predefined policy, the selection of a preferred network based on an ordered list, or bandwidth aggregation. As such, previous approaches do not exploit the different delay and loss characteristics of the different networks for application gains.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2A illustrates an example Tx/Rx matrix and associated stream parameter and path performance attribute example values in accordance with various implementations.

FIG. 3A illustrates another example Tx/Rx matrix and associated stream parameter and path performance attribute example values in accordance with various implementations.

FIG. 5A illustrates yet another example Tx/Rx matrix and associated stream parameter and path performance attribute example values in accordance with various implementations.

Figure 1A:
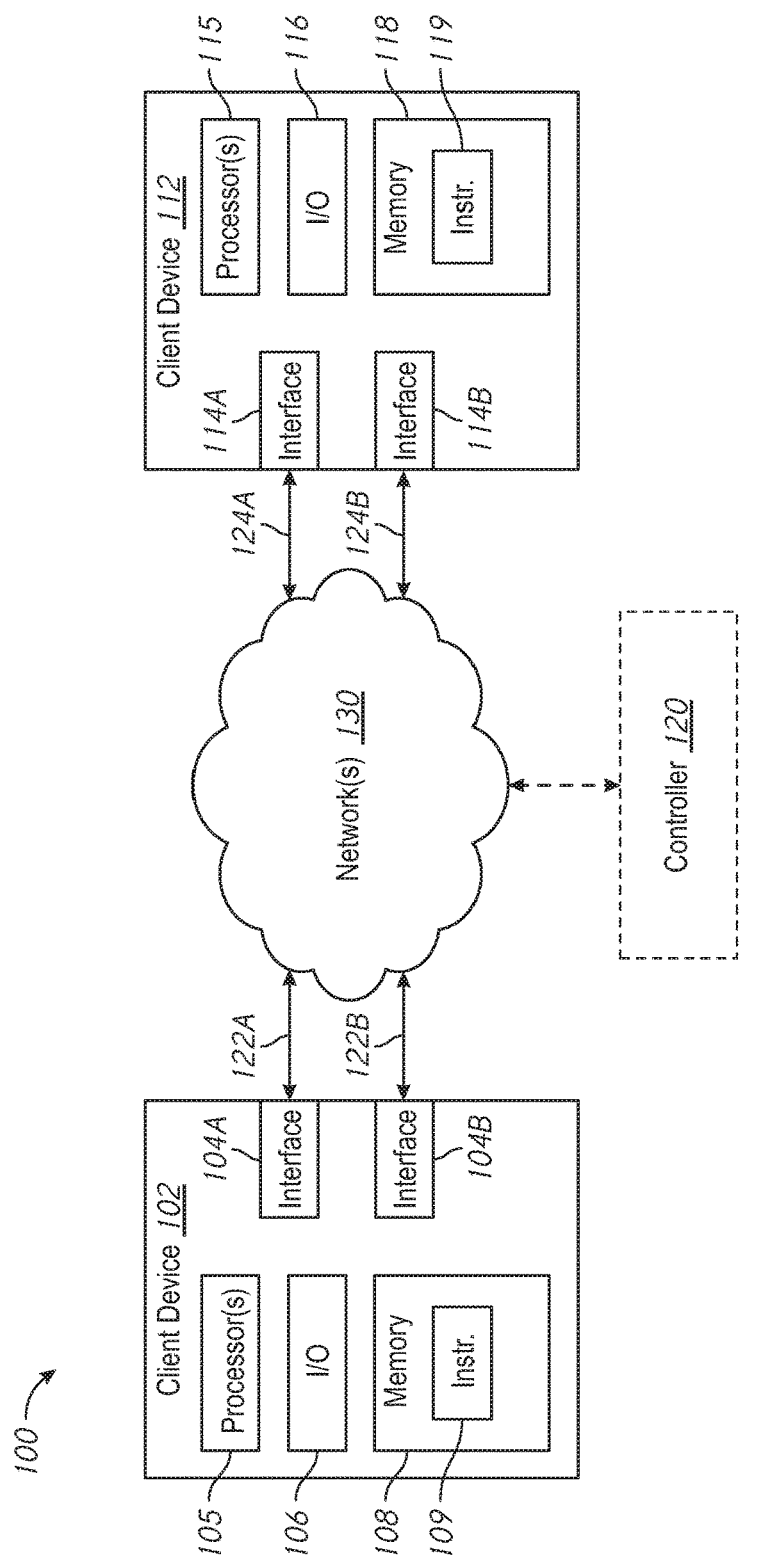
FIG. 1A is a block diagram of an example network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for jointly determining path-stream pairings. For example, in some implementations, a method includes: determining a plurality of candidate paths for a plurality of media streams, where each of the candidate paths is characterized by a first set of performance attributes and each of the plurality of media streams is characterized by a set of stream parameters; jointly determining a respective path from among the plurality of candidate paths that satisfies the set of stream parameters for each of the plurality of the media streams; and coordinating transmission of the plurality of media streams via the jointly determined respective path for each of the plurality of media streams. According to some implementations, the method is performed by a device with one or more processors and non-transitory memory.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

According to some implementations, the present disclosure leverages the availability of multiple networks beyond bandwidth aggregation. Instead, in some implementations, the methods described herein jointly determine path-stream pairings by matching the performance attributes of paths to the different stream parameters of the varying media streams. Furthermore, according to some implementations, the methods described allow for dynamic switching of path-stream pairings based on changing run-time network statistics. The method is dynamic and exploits run-time network measurements to best match media streams to paths. As such, the methods described herein are more efficient than common schemes that are either based on static preferences or ignore the delay and loss characteristics of the different paths and streams. The methods described herein may be performed at a client device, a media gateway, or a cloud-based controller.

In contrast to the present disclosure, previous approaches fail to exploit the differing tolerances between heterogeneous media streams such as potentially vast differences in loss and/or delay tolerances. Moreover, previous approaches do not take into account the different resilience characteristics and user experience parameters of the different media streams. For example, in a common conferencing application, it is common to transmit multiple streams with different delay tolerances. As one example, the common conferencing application is associated with a video stream and a presentation stream. In this example, the video stream has a tight delay tolerance in order maintain audio synchronization, and the presentation stream (e.g., a slideshow) has a much more relaxed delay tolerance.

FIG. 1A is a block diagram of an example network environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the network environment 100 includes: a first client device 102, a second client device 112, one or more networks 130, and an optional controller 120. According to some implementations, the one or more networks 130 correspond to one or more telecommunications networks (e.g., 3G, LTE, 4G, LTE Advanced, etc.), one or more portions of the public Internet, one or more local area networks (LANs), one or more wide area networks (WANs), one or more metropolitan area networks (MANs), one or more personal area networks (PANs), and/or the like.

In accordance with some implementations, the first client device 102 includes a first communication interface 104A, a second communication interface 104B, one or more processors 105, one or more input/output (I/O) devices 106 (e.g., a display, mouse, keyboard, touch screen, keypad, touch pad, and/or the like), and non-transitory memory 108 storing instructions 109. According to some implementations, the first client device 102 is communicatively coupled with the one or more networks 130 via a first communication link 122A (e.g., a WiFi connection), where the first communication interface 104A provides the first client device 102 with functionality to communicate using the first communication link 122A. According to some implementations, the first client device 102 is also communicatively coupled with the one or more networks 130 via a second communication link 122B (e.g., a 3G connection), where the second communication interface 104B provides the first client device 102 with functionality to communicate using the second communication link 122B. According to some implementations, those of ordinary skill in the art will appreciate from the present disclosure that the first client device 102 includes an arbitrary number of communication interfaces 104A and 104B and associated communication links 122A and 122B and that various other implementations may include a greater number of interfaces and associated communication links.

Similarly, in accordance with some implementations, the second client device 112 includes a first communication interface 114A, a second communication interface 114B, one or more processors 115, one or more I/O devices 116 (e.g., a display, mouse, keyboard, touch screen, keypad, touch pad, and/or the like), and non-transitory memory 118 storing instructions 119. According to some implementations, the second client device 112 is communicatively coupled with the one or more networks 130 via a first communication link 124A (e.g., a WiFi connection), where the first communication interface 114A provides the second client device 112 with functionality to communicate using the first communication link 124A. According to some implementations, the second client device 112 is also communicatively coupled with the one or more networks 130 via a second communication link 124B (e.g., a 3G connection), where the second communication interface 114B provides the second client device 112 with functionality to communicate using the second communication link 124B. According to some implementations, those of ordinary skill in the art will appreciate from the present disclosure that the second client device 112 includes an arbitrary number of communication interfaces 114A and 114B and associated communication links 124A and 124B and that various other implementations may include a greater number of interfaces and associated communication links.

In some implementations, the client device 102 and the client device 112 correspond to desktop computers, tablet computers, mobile phones, personal digital assistants (PDAs), wearable computing devices, set-top boxes (STBs), over-the-top (OTT) boxes, smart displays, teleconference equipment, or the like. In some implementations, the controller 120 is configured to perform a path-stream coordination process in order to transmit a plurality of media streams from a transmitting device (e.g., the first client device 102) to a receiving device (e.g., the second client device 112). According to some implementations, the path-stream coordination process (described in more detail with reference to FIG. 6) includes: obtaining a plurality of media streams (e.g., a video stream and a presentation stream for a videoconference) for transmission from a transmitting device (e.g., the first client device 102) to a receiving device (e.g., the second client device 112); determining a plurality of candidate paths from the transmitting device to a receiving device (e.g., WiFi and 3G networks); and jointly determining a best path for each of the media streams. According to some implementations, the path-stream coordination process is performed by the receiving device (e.g., the second client device 112), the transmitting device (e.g., the first client device 102), or a combination thereof.

Figure 1B:
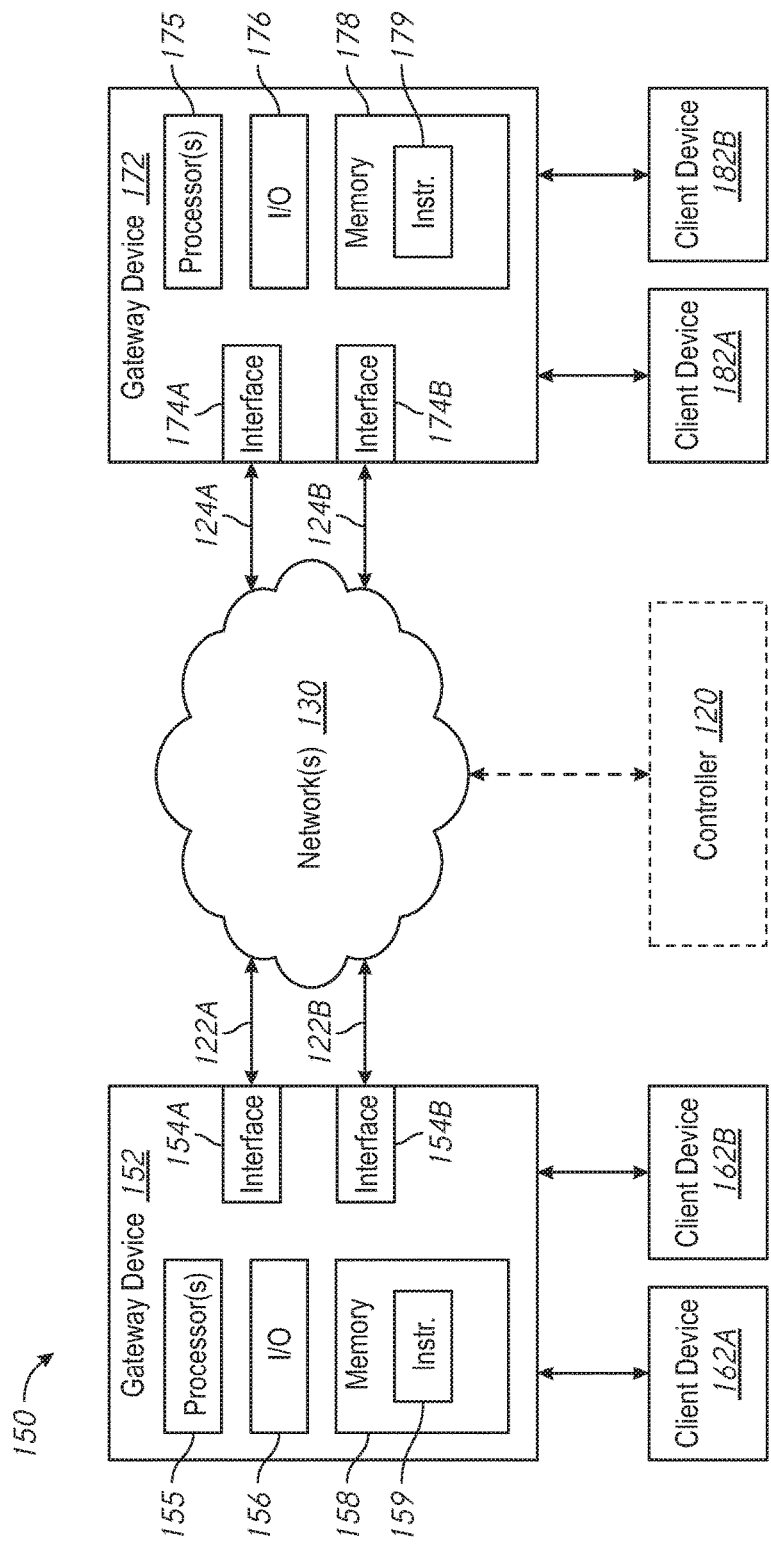
FIG. 1B is a block diagram of another example network environment in accordance with some implementations.

FIG. 1B is a block diagram of another example network environment 150 in accordance with some implementations. According to some implementations, the network environment 150 is similar to and adapted from the network environment 100 in FIG. 1A. As such, FIGS. 1A-1B include similar reference numerals and only the differences will be discussed herein for the sake of brevity. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the network environment 150 includes: a first gateway device 152 associated with client devices 162A and 162B, a second gateway device 172 associated with client devices 168A and 182B, one or more networks 130, and an optional controller 120.

In accordance with some implementations, the first gateway device 152 includes a first communication interface 154A, a second communication interface 154B, one or more processors 155, one or more I/O devices 156 (e.g., a display, mouse, keyboard, touch screen, keypad, touch pad, and/or the like), and non-transitory memory 158 storing instructions 159. According to some implementations, the first gateway device 152 is communicatively coupled with client devices 162A and 162B. According to some implementations, the first gateway device 152 is communicatively coupled with the one or more networks 130 via a first communication link 122A (e.g., a WiFi connection), where the first communication interface 154A provides the first gateway device 152 with functionality to communicate using the first communication link 122A. According to some implementations, the first gateway device 152 is also communicatively coupled with the one or more networks 130 via a second communication link 122B (e.g., a 3G connection), where the second communication interface 154B provides the first gateway device 152 with functionality to communicate using the second communication link 122B. According to some implementations, those of ordinary skill in the art will appreciate from the present disclosure that the first gateway device 152 includes an arbitrary number of communication interfaces 154A and 154B and associated communication links 122A and 122B and that various other implementations may include a greater number of interfaces and associated communication links.

Similarly, in accordance with some implementations, the second gateway device 172 includes a first communication interface 174A, a second communication interface 174B, one or more processors 175, one or more I/O devices 176 (e.g., a display, mouse, keyboard, touch screen, keypad, touch pad, and/or the like), and non-transitory memory 178 storing instructions 179. According to some implementations, the second gateway device 172 is communicatively coupled with client devices 182A and 182B. According to some implementations, the second gateway device 172 is communicatively coupled with the one or more networks 130 via a first communication link 124A (e.g., a WiFi connection), where the first communication interface 174A provides the second gateway device 172 with functionality to communicate using the first communication link 124A. According to some implementations, the second gateway device 172 is also communicatively coupled with the one or more networks 130 via a second communication link 124B (e.g., a 3G connection), where the second communication interface 174B provides the second gateway device 172 with functionality to communicate using the second communication link 124B. According to some implementations, those of ordinary skill in the art will appreciate from the present disclosure that the second gateway device 172 includes an arbitrary number of communication interfaces 174A and 174B and associated communication links 124A and 124B and that various other implementations may include a greater number of interfaces and associated communication links.

In some implementations, the first gateway device 152 and the second gateway device 172 correspond to routers, switches, hubs, servers, modems, or the like. In some implementations, the client devices 162A, 162B, 182A, and 182B correspond to desktop computers, tablet computers, mobile phones, PDAs, wearable computing devices, STBs, OTT boxes, smart displays, teleconference equipment, or the like.

In some implementations, the controller 120 is configured to perform a path-stream coordination process in order to transmit a plurality of media streams from a transmitting device (e.g., the first gateway device 152) to a receiving device (e.g., the second gateway device 172). According to some implementations, the path-stream coordination process (described in more detail with reference to FIG. 6) includes: obtaining a plurality of media streams (e.g., a video stream and a presentation stream for a videoconference) for transmission from a transmitting device (e.g., the first gateway device 152) to a receiving device (e.g., the second gateway device 172); determining a plurality of candidate paths from the transmitting device to a receiving device (e.g., WiFi and 3G networks); and jointly determining a best path for each of the media streams. According to some implementations, the path-stream coordination process is performed by the receiving device (e.g., the second gateway device 172), the transmitting device (e.g., first gateway device 152), or a combination thereof.

FIG. 2A illustrates an example Tx/Rx matrix 200 in accordance with various implementations. According to some implementations, the device (e.g., the controller 120, one of the client devices 102 or 112, one of the gateway devices 152 or 172, or a combination thereof, FIGS. 1A-1B) performs a path discovery process whereby transmission (Tx) interfaces of the transmitting device and reception (Rx) interfaces of the receiving device are identified in order to generate the Tx/Rx matrix 200. As shown in FIG. 2A, the Tx/Rx matrix 200 includes two rows: a first row associated with Tx interface 204A (e.g., corresponding to a WiFi connection of the transmitting device), and a second row associated with Tx interface 204B (e.g., corresponding to a 3G connection of the transmitting device). As shown in FIG. 2A, the Tx/Rx matrix 200 also includes two columns: a first column associated with Rx interface 206A (e.g., corresponding to a WiFi connection of the receiving device), and a second row associated with Rx interface 206B (e.g., corresponding to a 3G connection of the receiving device).

As such, the Tx/Rx matrix 200 includes candidate paths 242A, 242B, 242C, and 242D (sometimes herein collectively referred to as the "candidate paths 242"), which are each characterized by a set of performance attributes 202A, 202B, 202C, and 202D (sometimes herein collectively referred to as the "sets of performance attributes 202"). According to some implementations, each of the sets of performance attributes 202 includes a rate value, a loss value, and a delay value. As shown in FIG. 2A, the path 242A from Tx interface 204A to Rx interface 206A is characterized by the set of performance attributes 202A $\{R_{AA}, L_{AA}, D_{AA}\}$, the path 242B from Tx interface 204A to Rx interface 206B is characterized by the set of performance attributes 202B $\{R_{AB}, L_{AB}, D_{AB}\}$, the path 242C from Tx interface 204B to Rx interface 206A is characterized by the set of performance attributes 202C $\{R_{BA}, L_{BA}, D_{BA}\}$, and the path 242B from Tx interface 204B to Rx interface 206B is characterized by the set of performance attributes 202D $\{R_{BB}, L_{BB}, D_{BB}\}$.

According to some implementations, the Tx/Rx matrix 200 is trimmed according to a predefined set of criteria. According to some implementations, the Tx/Rx matrix 200 is trimmed according to a predefined policy. For example, candidate paths with orthogonal connection modalities are disregarded such as the path 242B (e.g., associated with a WiFi Tx interface and a 3G Rx interface) and the path 242C (e.g., associated with a 3G Tx interface and a WiFi Rx interface). In another example, candidate paths with insufficient bandwidth are disregarded. In yet another example, candidate paths that are associated with one or more reserved or disabled interfaces are disregarded.

FIG. 2A also illustrates a path attributes table 205 with a set of performance attributes 202A for path 242A and a set of performance attributes 202D for path 242D in accordance with various implementations. As shown in FIG. 2A, the set of performance attributes 202A that characterize the path 242A includes: a rate value ($R_{AA}$) of 3 Mbps, a loss value ($L_{AA}$) of 3%, and a delay value ($D_{AA}$) of 100 ms. Similarly, as shown in FIG. 2A, the set of performance attributes 202D that characterize the path 242D includes: a rate value ($R_{BB}$) of 3 Mbps, a loss value ($L_{BB}$) of 3%, and a delay value ($D_{BB}$) of 500 ms.

FIG. 2A further illustrates a media stream parameters table 215 with a set of stream parameters 234 for a media stream 232 and a set of stream parameters 238 for a media stream 236 in accordance with various implementations. As shown in FIG. 2A, the set of stream parameters 234 that characterize the first media stream 232 includes: a rate value ($R_{234}$) of 2 Mbps and a delay value ($D_{234}$) of 2000 ms. Similarly, as shown in FIG. 2A, the set of stream parameters 238 that characterize the second media stream 236 includes: a rate value ($R_{238}$) of 2 Mbps and a delay value ($D_{238}$) of 500 ms.

In this example, the rate values of both of the candidate paths 242A and 242D are sufficient to accommodate the media streams 232 and 236 because the rate values of both of the candidate paths (e.g., 3 Mbps) is greater than the rate values of both of the media streams (e.g., 2 Mbps). In this example, there are equal numbers of candidate paths (e.g., 2: candidate paths 242A and 242D) and media streams (e.g., 2: media streams 232 and 236). As such, the device (e.g., the controller 120, one of the client devices 102 or 112, one of the gateway devices 152 or 172, or a combination thereof, FIGS. 1A-1B) jointly determines a best group of path-stream pairings by applying each of the potential path-stream pairings to a retransmission model that seeks to minimize residual loss rate. According to some implementations, the number of possible retransmissions ($R_{floor}$) for a path-stream pairing is determined by:

$$R_{floor} = \text{floor}\left(\frac{\text{Stream delay} - \text{Path delay}}{2 \times \text{Path delay}}\right) \quad (1)$$

According to some implementations, the residual loss rate ($L_{Res}$) for the path-stream pairing is determined by:

$$L_{Res} = 100 \times (\text{Path loss rate}^{(1+R_{floor})}) \quad (2)$$

According to some implementations, the retransmission delay ($D_{Retrans}$) is determined by:

$$D_{Retrans} = \text{Path delay} + (\text{Path delay} \times 2 \times R_{floor}) \quad (3)$$

Figure 2B:
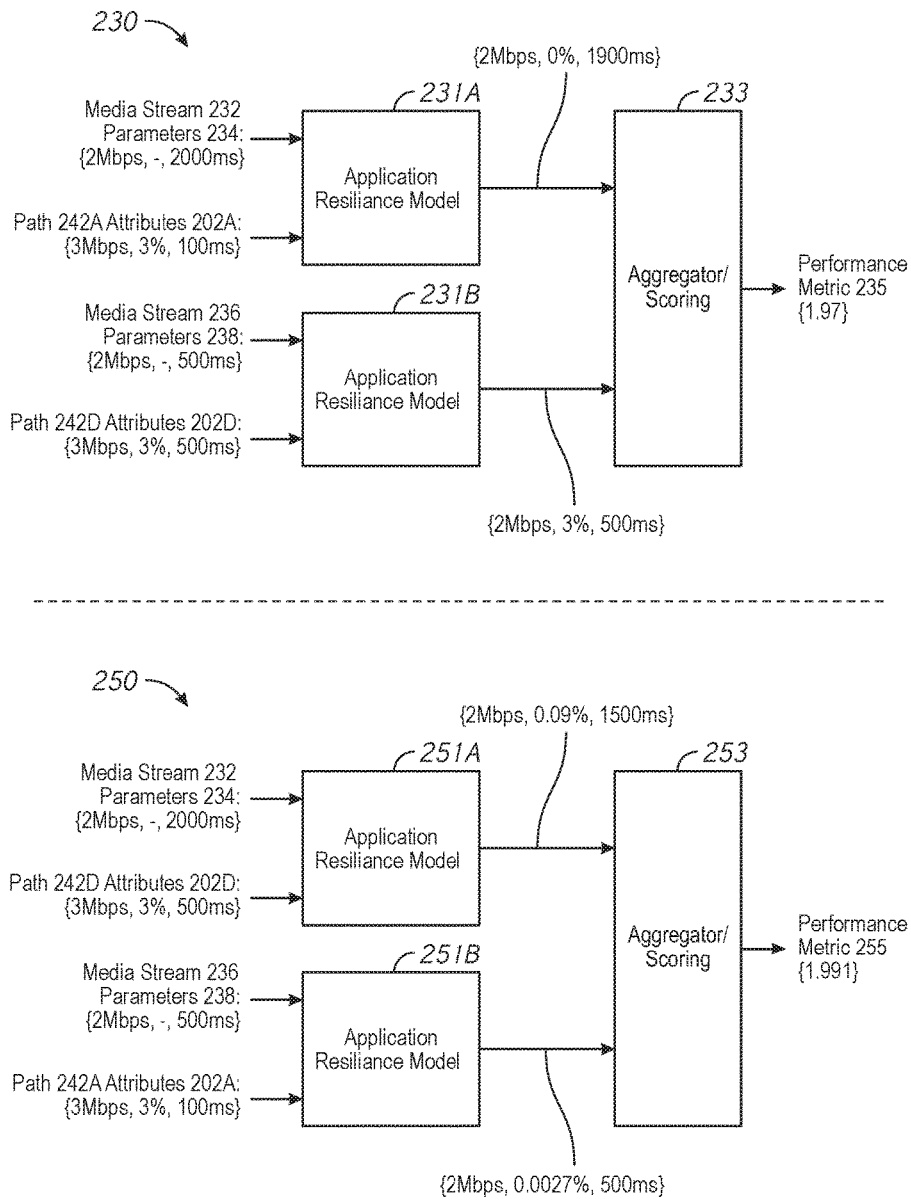
FIG. 2B illustrates block diagrams of modeling workflows for candidate groups of path-stream pairings based on the values in FIG. 2A in accordance with various implementations.

FIG. 2B illustrates a block diagram of a modeling workflow for a first scenario 230 of path-stream pairings in accordance with various implementations. In the scenario 230, the media stream 232 is matched to the path 242A (pairing 1), and the media stream 236 is matched to the path 242D (pairing 2). With respect to pairing 1 of the scenario 230, $R_{floor}$=9, $L_{Res}$=5.905E-16%, and $D_{Retrans}$=1900 ms. As such, the intermediate results₁ from application resilience block 231A correspond to {2 Mbps, 5.905E-16%, 1900 ms}. With respect to pairing 2 of the scenario 230, $R_{floor}$=0, $L_{Res}$=3%, and $D_{Retrans}$=500 ms. As such, the intermediate results₂ from the application resilience block 231B correspond to {2 Mbps, 3%, 500 ms}.

According to some implementations, the scenario 230 is assigned a performance metric 235 (sometimes also referred to herein as the "performance score") whereby the intermediate results from the application resilience blocks 231A and 231B are provided to the aggregator block 233. In some implementations, the performance metric is determined by a scoring function:

$$\text{Performance Metric} = \left\{\left(\left\{\begin{array}{l}1, \text{ if path } rate_1 \geq \text{stream } rate_1 \\ 0, \text{ if path } rate_1 < \text{stream } rate_1\end{array}\right\}\right) \times \right. \quad (4)$$

$$\left(\left\{\begin{array}{l}1, \text{ if } D_{Retrans1} \leq \text{stream } delay_2 \\ 0, \text{ if } D_{Retrans2} > \text{stream } delay_2\end{array}\right\}\right) \times (1 - L_{Res1})\right\} +$$

$$\left\{\left(\left\{\begin{array}{l}1, \text{ if path } rate_2 \geq \text{stream } rate_2 \\ 0, \text{ if path } rate_2 < \text{stream } rate_2\end{array}\right\}\right) \times \right.$$

$$\left.\left(\left\{\begin{array}{l}1, \text{ if } D_{Retrans2} \leq \text{stream } delay_2 \\ 0, \text{ if } D_{Retrans2} > \text{stream } delay_2\end{array}\right\}\right) \times (1 - L_{Res2})\right\}$$

Based on equation (4), the performance metric 235=1.97. As another example, the performance metric 235 is the sum of the residual loss rates (e.g., ~3%). As yet another example, the performance metric 235 is the average of the residual loss rates (e.g., ~1.5%). As yet another example, performance scores that depend on the residual loss rate ($L_{Res}$) with higher performance for lower values thereof may be a non-linear mapping from residual loss rate to the performance score or a weighted sum/average of the residual loss rates. As yet another example, performance scores that depend on the retransmission delay ($D_{Retrans}$) with higher performance for lower values thereof may be a non-linear mapping from retransmission delay to the performance score or a weighted sum/average of the retransmission delays.

FIG. 2B also illustrates a block diagram of a modeling workflow for a second scenario 250 of path-stream pairings in accordance with various implementations. In the scenario 250, the media stream 232 is matched to the path 242D (pairing 1), and the media stream 236 is matched to the path 242A (pairing 2). With respect to pairing 1 of the scenario 250, $R_{floor}$=1, $L_{Res}$=0.09%, and $D_{Retrans}$=1500 ms. As such, the intermediate results₁ from application resilience block 251A correspond to {2 Mbps, 0.09%, 1500 ms}. With respect to pairing 2 of the scenario 250, $R_{floor}$=2, $L_{Res}$=0.0027%, and $D_{Retrans}$=500 ms. As such, the intermediate results₂ from the application resilience block 251B correspond to {2 Mbps, 0.0027%, 500 ms}.

According to some implementations, the scenario 250 is assigned a performance metric 255 (sometimes also referred to herein as the "performance score") whereby the intermediate results from the application resilience blocks 251A and 251B are provided to the aggregator block 253. As such, based on equation (4), the performance metric 255=1.9991.

In this example, the performance metric 255 is greater than the performance metric 235. Thus, the device (e.g., the controller 120, one of the client devices 102 or 112, one of the gateway devices 152 or 172, or a combination thereof, FIGS. 1A-1B) coordinates transmission of the media streams according to the path-stream pairing in the scenario 250, where the media stream 232 is transmitted via the path 242D, and the media stream 236 is transmitted to the path 242A. According to some implementations, those of ordinary skill in the art will appreciate from the present disclosure that other models may be used to jointly determine a path from among the candidate paths for each of the plurality of media streams. Furthermore, in some implementations, the workflow block diagrams shown in FIGS. 2A-2B are non-limiting examples for the application of the retransmission modes and that various other implementations may include a modified workflow for the application of the retransmission model.

FIG. 3A illustrates an example Tx/Rx matrix 300 in accordance with various implementations. According to some implementations, the device (e.g., the controller 120, one of the client devices 102 or 112, one of the gateway devices 152 or 172, or a combination thereof, FIGS. 1A-1B) performs a path discovery process whereby Tx interfaces of the transmitting device and Rx interfaces of the receiving device are identified in order to generate the Tx/Rx matrix 300. As shown in FIG. 3A, the Tx/Rx matrix 300 includes two rows: a first row associated with Tx interface 304A (e.g., corresponding to a WiFi connection of the transmitting device), and a second row associated with Tx interface 304B (e.g., corresponding to a 3G connection of the transmitting device). As shown in FIG. 3A, the Tx/Rx matrix 300 also includes two columns: a first column associated with Rx interface 306A (e.g., corresponding to a WiFi connection of the receiving device), and a second row associated with Rx interface 306B (e.g., corresponding to a 3G connection of the receiving device).

As such, the Tx/Rx matrix 300 includes candidate paths 342A, 342B, 342C, and 342D (sometimes herein collectively referred to as the "candidate paths 342"), which are each characterized by a set of performance attributes 302A, 302B, 302C, and 302D (sometimes herein collectively referred to as the "sets of performance attributes 302"). According to some implementations, each of the sets of performance attributes 302 includes a rate value, a loss value, a delay value, and an error characteristic. As shown in FIG. 3A, the path 342A from Tx interface 304A to Rx interface 306A is characterized by the set of performance attributes 302A $\{R_{AA}, L_{AA}, D_{AA}\}$, the path 342B from Tx interface 304A to Rx interface 306B is characterized by the set of performance attributes 302B $\{R_{AB}, L_{AB}, D_{AB}\}$, the path 342C from Tx interface 304B to Rx interface 306A is characterized by the set of performance attributes 302C $\{R_{BA}, L_{BA}, D_{BA}\}$, and the path 342B from Tx interface 304B to Rx interface 306B is characterized by the set of performance attributes 302D $\{R_{BB}, L_{BB}, D_{BB}\}$.

According to some implementations, the Tx/Rx matrix 300 is trimmed according to a predefined set of criteria. According to some implementations, the Tx/Rx matrix 300 is trimmed according to a predefined policy. For example, candidate paths with orthogonal connection modalities are disregarded such as the path 342B (e.g., associated with a WiFi Tx interface and a 3G Rx interface) and the path 342C (e.g., associated with a 3G Tx interface and a WiFi Rx interface). In another example, candidate paths with insufficient bandwidth are disregarded. In yet another example, candidate paths that are associated with one or more reserved or disabled interfaces are disregarded.

FIG. 3A also illustrates a path attributes table 305 with a set of performance attributes 302A for path 342A and a set of performance attributes 302D for path 342D in accordance with various implementations. As shown in FIG. 3A, the set of performance attributes 302A that characterize the path 342A includes: a rate value ($R_{AA}$) of 2 Mbps with 10% ECC overhead, a loss value ($L_{AA}$) of 3% with isolated losses, and a delay value ($D_{AA}$) of 500 ms. Similarly, as shown in FIG. 3A, the set of performance attributes 302D that characterize the path 342D includes: a rate value ($R_{BB}$) of 2 Mbps with 10% ECC overhead, a loss value ($L_{BB}$) of 3% with clustered losses (e.g., occasional lost packets of up to 4 in a row), and a delay value ($D_{BB}$) of 100 ms.

FIG. 3A further illustrates a media stream parameters table 315 with a set of stream parameters 334 for a media stream 332 and a set of stream parameters 338 for a media stream 336 in accordance with various implementations. As shown in FIG. 3A, the set of stream parameters 334 that characterize the first media stream 332 includes: a rate value ($R_{334}$) of 1.5 Mbps with 10% ECC overhead and a delay value ($D_{334}$) of 500 ms. Similarly, as shown in FIG. 3A, the set of stream parameters 338 that characterize the second media stream 336 includes: a rate value ($R_{338}$) of 1.5 Mbps with 10% ECC overhead and a delay value ($D_{338}$) of 2000 ms In this example, the rate values of both of the candidate paths 342A and 342D are sufficient to accommodate one of the media streams 332 and 336 because the rate values of both of the candidate paths (e.g., 2 Mbps) is greater than the rate values of both of the media streams (e.g., 1.5 Mbps). As such, the device (e.g., the controller 120, one of the client devices 102 or 112, one of the gateway devices 152 or 172, or a combination thereof, FIGS. 1A-1B) jointly determines a best group of path-stream pairings by applying each of the potential path-stream pairings to an error correction model that takes into account the delay values and error characteristics.

At 1.5 Mbps and assuming 1400 bytes per packet, there is an average of 134 packets per second for the media streams 332 and 336. With 10% allowable error correction code (ECC) overhead for the media streams 332 and 336, as a first example error correction scheme, 1 parity packet is added every window of 10 packets, for example, using a Reed Solomon code. As such, with the first error correction scheme, the nominal ECC recovery delay for the media streams 332 and 336 is 10 packets, or 75 ms $$\left(\text{e.g., } 75 \text{ ms} = \frac{10 \text{ packets}}{134 \text{ packets per second}}\right).$$

As such, the first example error correction scheme is acceptable for media streams with a low delay tolerance. Furthermore, the first error correction scheme is able to correct isolated losses but is ineffective against clustered or burst losses.

With 10% allowable ECC overhead for the media streams 332 and 336, as a second example error correction scheme, 10 parity packets are added every window of 100 packets, for example, using a Reed Solomon code. As such, with the second error correction scheme, the nominal ECC recovery delay for the media streams 332 and 336 is 100 packets, or 750 ms $$\left(\text{e.g., } 750 \text{ ms} = \frac{100 \text{ packets}}{134 \text{ packets per second}}\right).$$

As such, the second example error correction scheme is acceptable for media streams with a high delay tolerance. Furthermore, the second error correction scheme is able to correct both isolated losses and clustered or burst losses.

As such, as one example, the media stream 332 (e.g., a video stream) with a lower delay tolerance (e.g., 500 ms) is encoded according to the first error correction scheme.

Furthermore, for example, the media stream 336 (e.g., a presentation stream) with a higher delay tolerance (e.g., 2000 ms) is encoded according to the second error correction scheme.

Figure 3B:
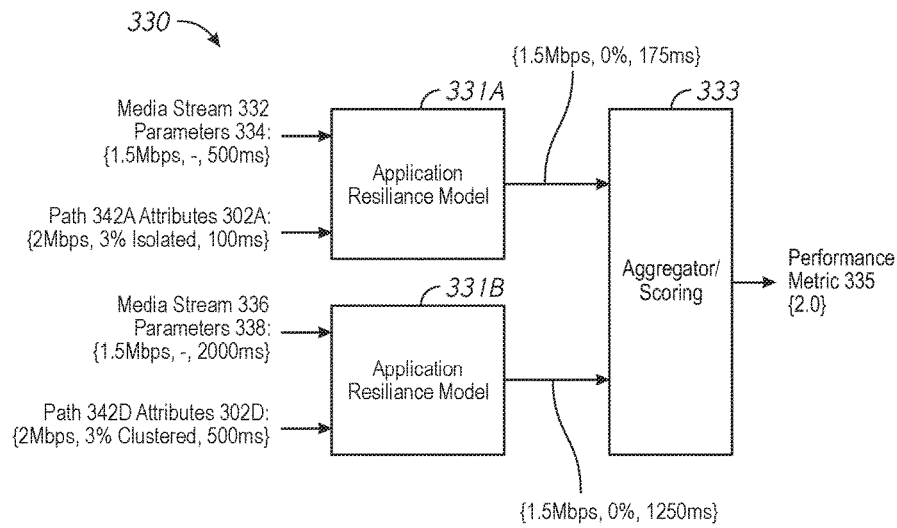
FIG. 3B illustrates block diagrams of modeling workflows for candidate groups of path-stream pairings based on the values in FIG. 3A in accordance with various implementations.
Figure 3B:
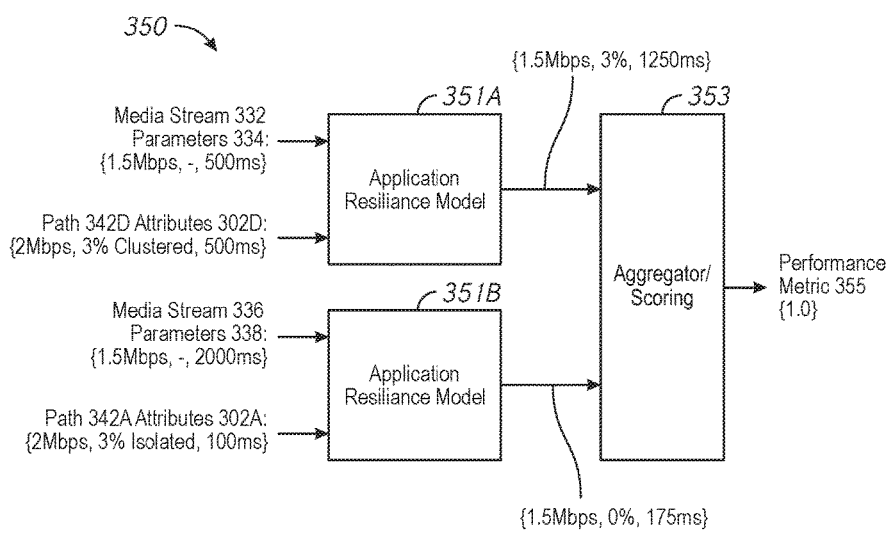

FIG. 3B illustrates a block diagram of a modeling workflow for a first scenario 330 of path-stream pairings in accordance with various implementations. In the scenario 330, the media stream 332 is matched to the path 342A (pairing 1), and the media stream 336 is matched to the path 342D (pairing 2). As such, in the scenario 330, the media stream 332 encoded according to the first error correction scheme, which accounts for isolated losses, is matched to the path 342A with isolated errors. Furthermore, in the scenario 330, the media stream 336 encoded according to the second error correction scheme, which accounts for clustered losses, is matched to the path 342D with clustered errors.

With respect to pairings 1 and 2 of the scenario 330, the intermediate results from application resilience blocks 331A and 331B correspond to {stream rate, residual loss rate, delivery delay}. According to some implementations, the residual loss rates (e.g., packet loss rates) for pairing 1 and pairing 2 correspond to perfect or near-perfect recovery of the media streams 332 and 336 (e.g., residual loss rate=~0%). With regard to pairing 2, in this example, the media stream 336 with a 2000 ms delay tolerance can be accommodated by the path 342D a combination of 500 ms path delay and 750 ms ECC recovery delay (e.g., a total delivery delay of 1250 ms).

Furthermore, the media stream encoded according to the first error correction scheme for isolated errors is matched to the path with the isolated error characteristic (e.g., a 3G network) and the media stream encoded according to the second error correction scheme for clustered errors is matched to the path with the clustered error characteristic (e.g., a WiFi network). As such, the intermediate results$_1$ from the application resilience block 331A corresponds to {1.5 Mbps, 0%, 175 ms}, and the intermediate results$_2$ from the application resilience block 331B corresponds to {1.5 Mbps, 0%, 1250 ms}.

According to some embodiments, the delivery delay ($D_{delivery}$) is the sum of the path delay and the ECC recovery delay. According to some implementations, the scenario 330 is assigned a performance metric 335 (sometimes also referred to herein as the "performance score") whereby the intermediate results from the application resilience blocks 331A and 331B are provided to the aggregator block 333. In some implementations, the performance metric is determined by a scoring function:

$$\text{Performance Metric} = \left\{ \left( \left\{ \begin{array}{l} 1, \text{if path } rate_1 \geq \text{stream } rate_1 \\ 0, \text{if path } rate_1 < \text{stream } rate_1 \end{array} \right\} \times \right. \right. \quad (5)$$

$$\left( \left\{ \begin{array}{l} 1, \text{if } D_{delivery1} \leq \text{stream } delay_1 \\ 0, \text{if } D_{delivery1} > \text{stream } delay_1 \end{array} \right\} \times \right.$$

$$(1 - \text{packet loss } rate_1) \Bigg\} +$$

$$\left\{ \left( \left\{ \begin{array}{l} 1, \text{if path } rate_2 \geq \text{stream } rate_2 \\ 0, \text{if path } rate_2 < \text{stream } rate_2 \end{array} \right\} \times \right. \right.$$

$$\left( \left\{ \begin{array}{l} 1, \text{if } D_{delivery2} \leq \text{stream } delay_2 \\ 0, \text{if } D_{delivery2} > \text{stream } delay_2 \end{array} \right\} \times \right.$$

$$(1 - \text{packet loss } rate_2) \Bigg\}$$

Based on equation (5), the performance metric 335=2.0. As another example, the performance metric 335 is the sum of the residual loss rates (e.g., 0%). As yet another example, the performance metric 335 is the average of the residual loss rates (e.g., 0%). As yet another example, the performance metric 335 is a non-linear mapping from residual loss rates to performance score. As yet another example, the performance metric 335 is a weighted sum/average of the residual loss rates. As yet another example, the performance metric 335 is a non-linear mapping from the delivery delay to the performance score or a weighted sum/average of the delivery delays.

FIG. 3B also illustrates a block diagram of a modeling workflow for a second scenario 350 of path-stream pairings in accordance with various implementations. In the scenario 350, the media stream 332 is matched to the path 342D (pairing 1), and the media stream 336 is matched to the path 242A (pairing 2). As such, in the scenario 350, the media stream 332 encoded according to the first error correction scheme, which accounts for isolated losses, is matched to the path 342D clustered errors. Furthermore, in the scenario 330, the media stream 336 encoded according to the second error correction scheme, which accounts for clustered losses, is matched to the path 342A with isolated errors.

With respect to pairings 1 and 2 of the scenario 350, the intermediate results from application resilience blocks 351A and 351B correspond to {stream rate, residual loss rate, delivery delay}. According to some implementations, the packet loss rate for pairing 1 corresponds to a non-trivial loss rate (e.g., residual loss rate=~3%) due to the media stream (e.g., the media stream 332) encoded according to the first error correction scheme for isolated errors being matched to the path (e.g., the path 342D) with the clustered error characteristic (e.g., the WiFi network). As such, the intermediate results$_1$ from the application resilience block 351A corresponds to {1.5 Mbps, 3%, 1250 ms}, and the intermediate results$_2$ from the application resilience block 351B corresponds to {1.5 Mbps, 0%, 175 ms}. Based on equation (5), the performance metric 355=1.0.

Specifically, the delay tolerance of the media stream 332 (e.g., 500 ms) corresponds to 67 packets (e.g., 67 packets=134 packets per second×500 ms). With 10% ECC overhead, the biggest window size the media stream 332 uses is 6 parity packets every 60 packets, which can correct bursts of up to 6 packets, but cannot correct clustered losses greater than 6.

In this example, the performance metric 335 is greater than the performance metric 355. Thus, the device (e.g., the controller 120, one of the client devices 102 or 112, one of the gateway devices 152 or 172, or a combination thereof, FIGS. 1A-1B) coordinates transmission of the media streams according to the path-stream pairing in the scenario 330, where the media stream 332 is transmitted via the path 342A, and the media stream 336 is transmitted to the path 342D. According to some implementations, those of ordinary skill in the art will appreciate from the present disclosure that other models may be used to jointly determine a path from among the candidate paths for each of the plurality of media streams. Furthermore, in some implementations, the workflow block diagrams shown in FIGS. 3A-3B are non-limiting examples for the application of the error correction model and that various other implementations may include a modified workflow for the application of the error correction model.

Figure 4A:
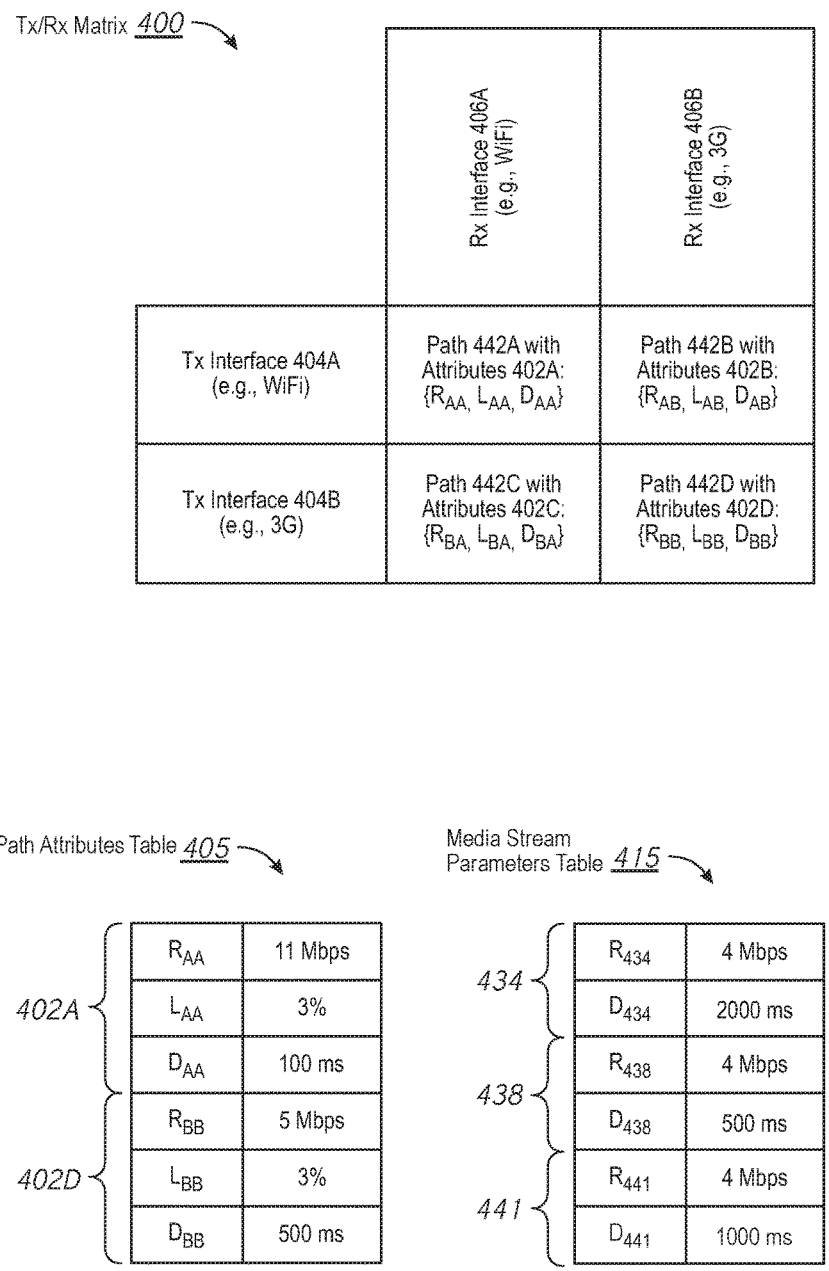
FIG. 4A illustrates yet another example Tx/Rx matrix and associated stream parameter and path performance attribute example values in accordance with various implementations.

FIG. 4A illustrates an example Tx/Rx matrix 400 in accordance with various implementations. According to some implementations, the device (e.g., the controller 120, one of the client devices 102 or 112, one of the gateway devices 152 or 172, or a combination thereof, FIGS. 1A-1B) performs a path discovery process whereby Tx interfaces of the transmitting device and Rx interfaces of the receiving device are identified in order to generate the Tx/Rx matrix 400. As shown in FIG. 4A, the Tx/Rx matrix 400 includes two rows: a first row associated with Tx interface 404A (e.g., corresponding to a WiFi connection of the transmitting device), and a second row associated with Tx interface 404B (e.g., corresponding to a 3G connection of the transmitting device). As shown in FIG. 4A, the Tx/Rx matrix 400 also includes two columns: a first column associated with Rx interface 406A (e.g., corresponding to a WiFi connection of the receiving device), and a second row associated with Rx interface 406B (e.g., corresponding to a 3G connection of the receiving device).

As such, the Tx/Rx matrix 400 includes candidate paths 442A, 442B, 442C, and 442D (sometimes herein collectively referred to as the "candidate paths 442"), which are each characterized by a set of performance attributes 402A, 402B, 402C, and 402D (sometimes herein collectively referred to as the "sets of performance attributes 402"). According to some implementations, each of the sets of performance attributes 402 includes a rate value, a loss value, and a delay value. As shown in FIG. 4A, the path 442A from Tx interface 404A to Rx interface 406A is characterized by the set of performance attributes 402A $\{R_{AA}, L_{AA}, D_{AA}\}$, the path 442B from Tx interface 404A to Rx interface 406B is characterized by the set of performance attributes 402B $\{R_{AB}, L_{AB}, D_{AB}\}$, the path 442C from Tx interface 404B to Rx interface 406A is characterized by the set of performance attributes 402C $\{R_{BA}, L_{BA}, D_{BA}\}$, and the path 442D from Tx interface 404B to Rx interface 406B is characterized by the set of performance attributes 402D $\{R_{BB}, L_{BB}, D_{BB}\}$.

According to some implementations, the Tx/Rx matrix 400 is trimmed according to a predefined set of criteria. According to some implementations, the Tx/Rx matrix 400 is trimmed according to a predefined policy. For example, candidate paths with orthogonal connection modalities are disregarded such as the path 442B (e.g., associated with a WiFi Tx interface and a 3G Rx interface) and the path 442C (e.g., associated with a 3G Tx interface and a WiFi Rx interface). In another example, candidate paths with insufficient bandwidth are disregarded. In yet another example, candidate paths that are associated with one or more reserved or disabled interfaces are disregarded.

FIG. 4A also illustrates a path attributes table 405 with a set of performance attributes 402A for path 442A and a set of performance attributes 402D for path 442D in accordance with various implementations. As shown in FIG. 4A, the set of performance attributes 402A that characterize the path 442A includes: a rate value ($R_{AA}$) of 11 Mbps, a loss value ($L_{AA}$) of 3%, and a delay value ($D_{AA}$) of 100 ms. Similarly, as shown in FIG. 4A, the set of performance attributes 402D that characterize the path 442D includes: a rate value ($R_{BB}$) of 5 Mbps, a loss value ($L_{BB}$) of 3%, and a delay value ($D_{BB}$) of 500 ms.

FIG. 4A further illustrates a media stream parameters table 415 with a set of stream parameters 434 for a media stream 432, a set of stream parameters 438 for a media stream 436, and a set of stream parameters 441 for a media stream 440 in accordance with various implementations. As shown in FIG. 4A, the set of stream parameters 434 that characterize the first media stream 432 includes: a rate value ($R_{434}$) of 4 Mbps and a delay value ($D_{434}$) of 2000 ms. Similarly, as shown in FIG. 4A, the set of stream parameters 438 that characterize the second media stream 436 includes: a rate value ($R_{438}$) of 4 Mbps and a delay value ($D_{438}$) of 500 ms. Furthermore, as shown in FIG. 4A, the set of stream parameters 441 that characterize the third media stream 440 includes: a rate value ($R_{441}$) of 4 Mbps and a delay value ($D_{441}$) of 1000 ms.

In this example, the rate value of candidate path 442A is sufficient to accommodate any two the media streams 432, 436, and 440 because the rate value of the candidate path 442A (e.g., 11 Mbps) is greater than the sum of the rate values of any two of the media streams. Continuing with this example, the rate value of candidate path 442D is sufficient to accommodate one of the media streams 432, 436, and 440 because the rate value of the candidate path 442D (e.g., 5 Mbps) is greater than the rate values of any one of the media streams. In this example, there is a lesser number of candidate paths (e.g., 2: candidate paths 442A and 442D) than media streams (e.g., 3: media streams 432, 436, and 440). As such, the device (e.g., the controller 120, one of the client devices 102 or 112, one of the gateway devices 152 or 172, or a combination thereof, FIGS. 1A-1B) jointly determines a best group of path-stream pairings by applying each of the potential path-stream pairings to a retransmission model that seeks to minimize residual loss rate. A number of possible retransmissions ($R_{floor}$) for a path-stream pairing is determined by equation (1) described above with reference to FIG. 2B. The residual loss rate ($L_{Res}$) for the path-stream pairing is determined by the equation (2) described above with reference to FIG. 2B. The retransmission delay for the path-stream pairing is determined by the equation (3) described above with reference to FIG. 2B.

Figure 4B:
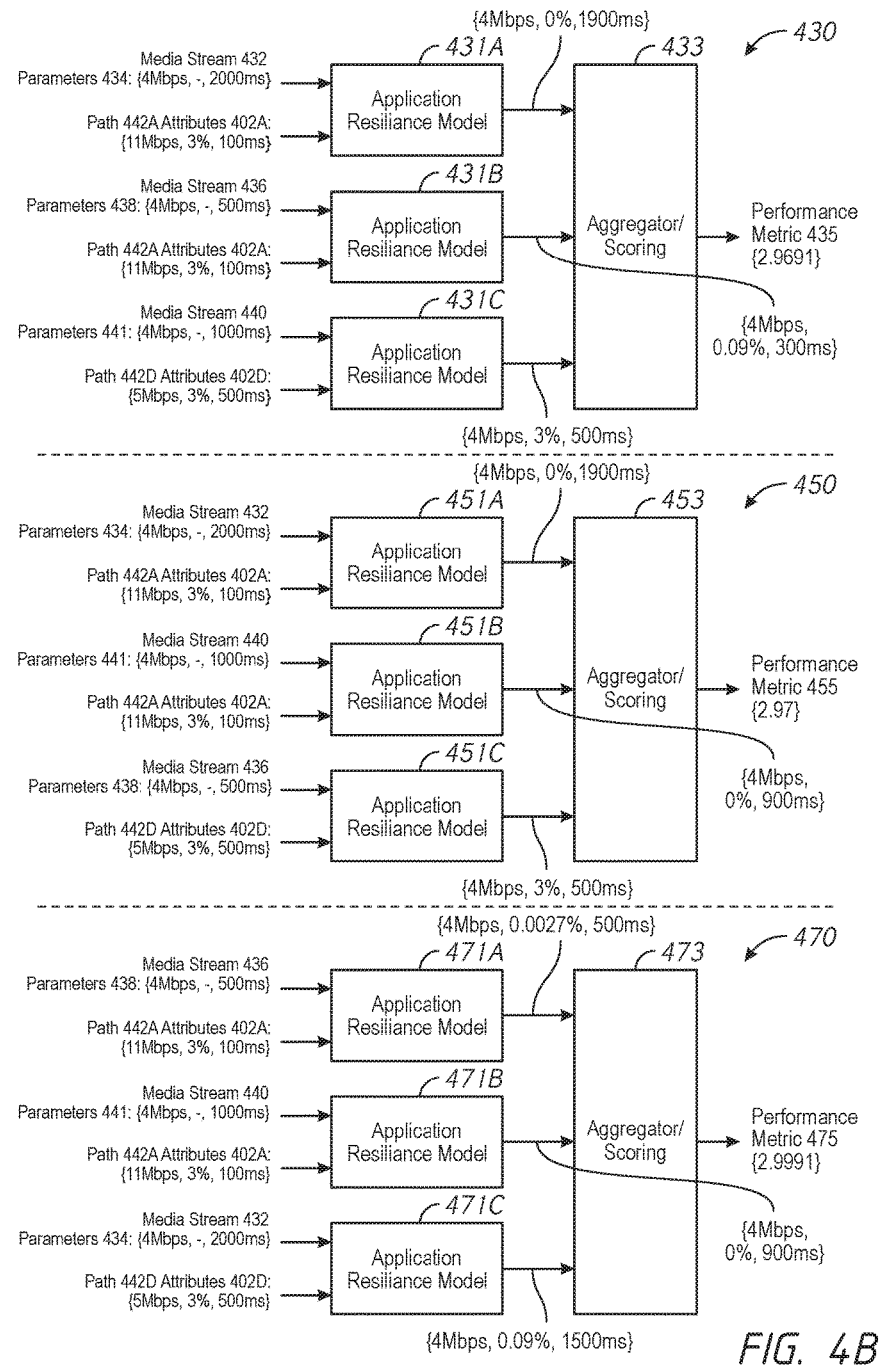
FIG. 4B illustrates block diagrams of modeling workflows for candidate groups of path-stream pairings based on the values in FIG. 4A in accordance with various implementations.

FIG. 4B illustrates a block diagram of a modeling workflow for a first scenario 430 of path-stream pairings in accordance with various implementations. In the scenario 430, the media stream 432 is matched to the path 442A (pairing 1), the media stream 436 is matched to the path 442A (pairing 2), and the media stream 440 is matched to the path 442D (pairing 3). With respect to pairing 1 of the scenario 430, $R_{floor}=9$, $L_{Res}=5.905E-16\%$, and $D_{Retrans}=1900$ ms. As such, the intermediate results$_1$ from application resilience block 431A correspond to {4 Mbps, 5.905E-16%, 1900 ms}. With respect to pairing 2 of the scenario 430, $R_{floor}=1$, $L_{Res}=0.09\%$, and $D_{Retrans}=300$ ms. As such, the intermediate results$_2$ from the application resilience block 431B correspond to {4 Mbps, 0.09%, 300 ms}. With respect to pairing 3 of the scenario 430, $R_{floor}=0$, $L_{Res}=3\%$, and $D_{Retrans}=500$ ms. As such, the intermediate results$_3$ from the application resilience block 431C correspond to {4 Mbps, 3%, 500 ms}.

According to some implementations, the scenario 430 is assigned a performance metric 435 (sometimes also referred to herein as the "performance score") whereby the intermediate results from the application resilience blocks 431A and 431B are provided to the aggregator block 433. As a result, based on equation (4), the performance metric 435=2.9691.

FIG. 4B also illustrates a block diagram of a modeling workflow for a second scenario 450 of path-stream pairings in accordance with various implementations. In the scenario 450, the media stream 432 is matched to the path 442A (pairing 1), the media stream 440 is matched to the path 442A (pairing 2), and the media stream 436 is matched to the path 442D (pairing 3). With respect to pairing 1 of the scenario 450, $R_{floor}=9$, $L_{Res}=5.905E-16\%$, and $D_{Retrans}=1900$ ms. As such, the intermediate results$_1$ from application resilience block 451A correspond to {4 Mbps, 5.905E-16%, 1900 ms}. With respect to pairing 2 of the scenario 450, $R_{floor}=4$, $L_{Res}=2.43E-8\%$, and $D_{Retrans}=900$ ms. As such, the intermediate results$_2$ from the application resilience block 451B correspond to {4 Mbps, 2.43E-8%, 900 ms}. With respect to pairing 3 of the scenario 450, $R_{floor}$=0, $L_{Res}$=3%, and $D_{Retrans}$=500 ms. As such, the intermediate results$_3$ from the application resilience block 451C correspond to {4 Mbps, 3%, 500 ms}.

According to some implementations, the scenario 450 is assigned a performance metric 455 (sometimes also referred to herein as the "performance score") whereby the intermediate results from the application resilience blocks 451A and 451B are provided to the aggregator block 453. As a result, based on equation (4), the performance metric 455=2.97.

FIG. 4B further illustrates a block diagram of a modeling workflow for a third scenario 470 of path-stream pairings in accordance with various implementations. In the scenario 470, the media stream 436 is matched to the path 442A (pairing 1), the media stream 440 is matched to the path 442A (pairing 2), and the media stream 432 is matched to the path 442D (pairing 3). With respect to pairing 1 of the scenario 470, $R_{floor}$=2, $L_{Res}$=0.0027%, and $D_{Retrans}$=500 ms. As such, the intermediate results$_1$ from application resilience block 471A correspond to {4 Mbps, =0.0027%, 500 ms}. With respect to pairing 2 of the scenario 470, $R_{floor}$=4, $L_{Res}$=2.43E-8%, and $D_{Retrans}$=900 ms. As such, the intermediate results$_2$ from the application resilience block 471B correspond to {4 Mbps, 2.43E-8%, 900 ms}. With respect to pairing 3 of the scenario 470, $R_{floor}$=1, $L_{Res}$=0.09%, and $D_{Retrans}$=1500 ms. As such, the intermediate results$_3$ from the application resilience block 471C correspond to {4 Mbps, 0.09%, 1500 ms}.

According to some implementations, the scenario 470 is assigned a performance metric 475 (sometimes also referred to herein as the "performance score") whereby the intermediate results from the application resilience blocks 471A and 471B are provided to the aggregator block 473. As a result, based on equation (4), the performance metric 475=2.9991.

In this example, the performance metric 475 is greater than the performance metrics 435 and 455. Thus, the device (e.g., the controller 120, one of the client devices 102 or 112, one of the gateway devices 152 or 172, or a combination thereof, FIGS. 1A-1B) coordinates transmission of the media stream according to the path-stream pairing in the scenario 470, where the media stream 436 is transmitted via the path 442A, the media stream 440 is transmitted via the path 442A, and the media stream 432 is transmitted via the path 442D.

FIG. 5A illustrates an example Tx/Rx matrix 500 in accordance with various implementations. According to some implementations, the device (e.g., the controller 120, one of the client devices 102 or 112, one of the gateway devices 152 or 172, or a combination thereof, FIGS. 1A-1B) performs a path discovery process whereby Tx interfaces of the transmitting device and Rx interfaces of the receiving device are identified in order to generate the Tx/Rx matrix 500. As shown in FIG. 5A, the Tx/Rx matrix 500 includes three rows: a first row associated with Tx interface 504A (e.g., corresponding to a WiFi connection of the transmitting device), a second row associated with Tx interface 504B (e.g., corresponding to a 3G connection of the transmitting device), and a third row associated with Tx interface 504C (e.g., corresponding to another connection of the transmitting device). As shown in FIG. 5A, the Tx/Rx matrix 500 also includes three columns: a first column associated with Rx interface 506A (e.g., corresponding to a WiFi connection of the receiving device), a second row associated with Rx interface 506B (e.g., corresponding to a 3G connection of the receiving device), and a third row associated with Rx interface 506C (e.g., corresponding to another connection of the receiving device).

As such, the Tx/Rx matrix 500 includes candidate paths 542A, 542B, 542C, 542D, 542E, 542F, 542G, 542H, and 542I (sometimes herein collectively referred to as the "candidate paths 542"), which are each characterized by a set of performance attributes 502A, 502B, 502C, 502D, 502E, 502F, 502G, 502H, and 502I (sometimes herein collectively referred to as the "sets of performance attributes 502"). According to some implementations, each of the sets of performance attributes 502 includes a rate value, a loss value, and a delay value. As shown in FIG. 5A, the path 542A from Tx interface 504A to Rx interface 506A is characterized by the set of performance attributes 502A {$R_{AA}$, $L_{AA}$, $D_{AA}$}, the path 542B from Tx interface 504A to Rx interface 506B is characterized by the set of performance attributes 502B {$R_{AB}$, $L_{AB}$, $D_{AB}$}, and the path 542C from Tx interface 504A to Rx interface 506C is characterized by the set of performance attributes 502C {$R_{AC}$, $L_{AC}$, $D_{AC}$}.

Similarly, as shown in FIG. 5A, the path 542D from Tx interface 504B to Rx interface 506A is characterized by the set of performance attributes 502D {$R_{BA}$, $L_{BA}$, $D_{BA}$}, the path 542E from Tx interface 504B to Rx interface 506B is characterized by the set of performance attributes 502E {$R_{BB}$, $L_{BB}$, $D_{BB}$}, and the path 542F from Tx interface 504B to Rx interface 506C is characterized by the set of performance attributes 502F {$R_{BC}$, $L_{BC}$, $D_{BC}$}. Moreover, as shown in FIG. 5A, the path 542G from Tx interface 504C to Rx interface 506A is characterized by the set of performance attributes 502G {$R_{CA}$, $L_{CA}$, $D_{CA}$}, the path 542H from Tx interface 504C to Rx interface 506B is characterized by the set of performance attributes 502H {$R_{CB}$, $L_{CB}$, $D_{CB}$}, and the path 542I from Tx interface 504C to Rx interface 506C is characterized by the set of performance attributes 502I {$R_{CC}$, $L_{CC}$, $D_{CC}$}.

According to some implementations, the Tx/Rx matrix 500 is trimmed according to a predefined set of criteria. According to some implementations, the Tx/Rx matrix 500 is trimmed according to a predefined policy. For example, candidate paths with orthogonal connection modalities are disregarded such as the paths 542B, 542C, 542D, 542F, 542G, and 542H. In another example, candidate paths with insufficient bandwidth are disregarded. In yet another example, candidate paths that are associated with one or more reserved or disabled interfaces are disregarded.

FIG. 5A also illustrates a path attributes table 505 with a set of performance attributes 502A for path 542A, a set of performance attributes 502E for path 542E, and a set of performance attributes 502I for path 542I in accordance with various implementations. As shown in FIG. 5A, the set of performance attributes 502A that characterize the path 542A includes: a rate value ($R_{AA}$) of 5 Mbps, a loss value ($L_{AA}$) of 3%, and a delay value ($D_{AA}$) of 100 ms. Similarly, as shown in FIG. 5A, the set of performance attributes 502E that characterize the path 542E includes: a rate value ($R_{BB}$) of 5 Mbps, a loss value ($L_{BB}$) of 3%, and a delay value ($D_{BB}$) of 500 ms. Moreover, as shown in FIG. 5A, the set of performance attributes 502I that characterize the path 542I includes: a rate value ($R_{CC}$) of 5 Mbps, a loss value ($L_{CC}$) of 3%, and a delay value ($D_{CC}$) of 250 ms.

FIG. 5A further illustrates a media stream parameters table 515 with a set of stream parameters 534 for a media stream 532 and a set of stream parameters 538 for a media stream 336 in accordance with various implementations. As shown in FIG. 5A, the set of stream parameters 534 that characterize the first media stream 532 includes: a rate value ($R_{534}$) of 4 Mbps and a delay value ($D_{534}$) of 2000 ms. Similarly, as shown in FIG. 5A, the set of stream parameters 538 that characterize the second media stream 536 includes: a rate value ($R_{538}$) of 4 Mbps and a delay value ($D_{538}$) of 500 ms.

In this example, the rate values of the candidate paths 542A, 542E, and 542I are sufficient to accommodate one of the media streams 532 and 536 because the rate values of the candidate paths (e.g., 5 Mbps) is greater than the rate values of the media streams (e.g., 4 Mbps). In this example, there is a greater number of candidate paths (e.g., 3: candidate paths 542A, 542E, and 542I) than media streams (e.g., 2: media streams 532 and 536). As such, the device (e.g., the controller 120, one of the client devices 102 or 112, one of the gateway devices 152 or 172, or a combination thereof, FIGS. 1A-1B) jointly determines a best group of path-stream pairings by applying each of the potential path-stream pairings to a retransmission model that seeks to minimize residual loss rate. A number of possible retransmissions ($R_{floor}$) for a path-stream pairing is determined by equation (1) described above with reference to FIG. 2B. The residual loss rate ($L_{Res}$) for the path-stream pairing is determined by the equation (2) described above with reference to FIG. 2B. The retransmission delay for the path-stream pairing is determined by the equation (3) described above with reference to FIG. 2B.

Figure 5B:
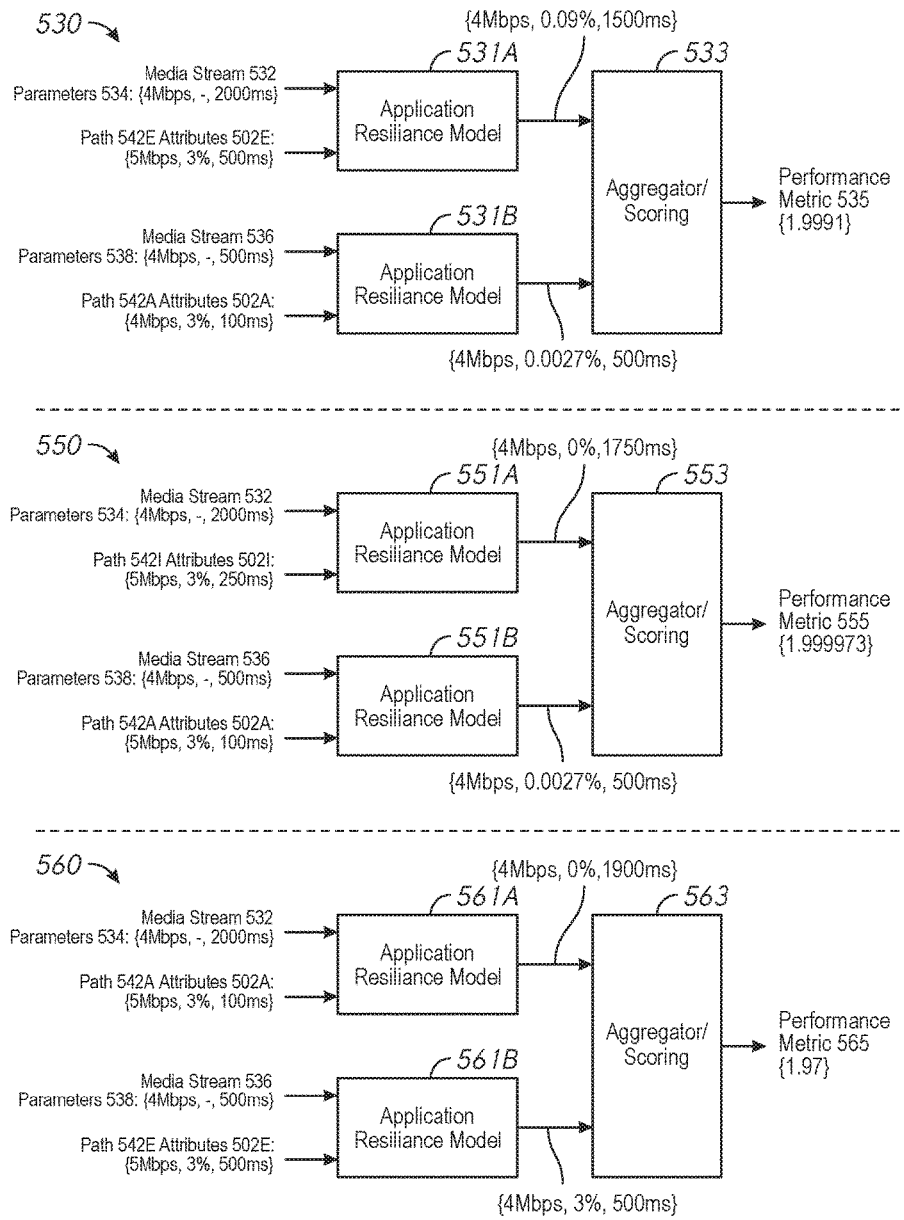
FIGS. 5B-5C illustrate block diagrams of modeling workflows for candidate groups of path-stream pairings based on the values in FIG. 5A in accordance with various implementations.

FIG. 5B illustrates a block diagram of a modeling workflow for a first scenario 530 of path-stream pairings in accordance with various implementations. In the scenario 530, the media stream 532 is matched to the path 542E (pairing 1), and the media stream 536 is matched to the path 542A (pairing 2). With respect to pairing 1 of the scenario 530, $R_{floor}$=1, $L_{Res}$=0.09%, and $D_{Retrans}$=1500 ms. As such, the intermediate results₁ from application resilience block 531A corresponds to {4 Mbps, 0.09%, 1500 ms}. With respect to pairing 2 of the scenario 530, $R_{floor}$=2, $L_{Res}$=0.0027%, and $D_{Retrans}$=500 ms. As such, the intermediate results₂ from the application resilience block 531B correspond to {4 Mbps, 0.0027%, 500 ms}.

According to some implementations, the scenario 530 is assigned a performance metric 535 (sometimes also referred to herein as the "performance score") whereby the intermediate results from the application resilience blocks 531A and 531B are provided to the aggregator block 533. As a result, based on equation (4), the performance metric 535=1.9991.

FIG. 5B also illustrates a block diagram of a modeling workflow for a second scenario 550 of path-stream pairings in accordance with various implementations. In the scenario 550, the media stream 532 is matched to the path 542I (pairing 1), and the media stream 536 is matched to the path 542A (pairing 2). With respect to pairing 1 of the scenario 550, $R_{floor}$=3, $L_{Res}$=2.43E-8%, and $D_{Retrans}$=1750 ms. As such, the intermediate results₁ from application resilience block 551A correspond to {4 Mbps, 2.43E-8%, 1750 ms}. With respect to pairing 2 of the scenario 550, $R_{floor}$=2, $L_{Res}$=0.0027%, and $D_{Retrans}$=500 ms. As such, the intermediate results₂ from the application resilience block 551B correspond to {4 Mbps, 0.0027%, 500 ms}.

According to some implementations, the scenario 550 is assigned a performance metric 555 (sometimes also referred to herein as the "performance score") whereby the intermediate results from the application resilience blocks 551A and 551B are provided to the aggregator block 553. As a result, based on equation (4), the performance metric 555=1.999973.

FIG. 5B further illustrates a block diagram of a modeling workflow for a third scenario 560 of path-stream pairings in accordance with various implementations. In the scenario 560, the media stream 532 is matched to the path 542A (pairing 1), and the media stream 536 is matched to the path 542E (pairing 2). With respect to pairing 1 of the scenario 560, $R_{floor}$=9, $L_{Res}$=5.905E-16%, and $D_{Retrans}$=1900 ms. As such, the intermediate results₁ from application resilience block 561A correspond to {4 Mbps, 5.905E-16%%, 1900 ms}. With respect to pairing 2 of the scenario 560, $R_{floor}$=0, $L_{Res}$=3%, and $D_{Retrans}$=500 ms. As such, the intermediate results₂ from the application resilience block 561B correspond to {4 Mbps, 3%, 500 ms}.

According to some implementations, the scenario 560 is assigned a performance metric 565 (sometimes also referred to herein as the "performance score") whereby the intermediate results from the application resilience blocks 561A and 561B are provided to the aggregator block 563. As a result, based on equation (4), the performance metric 565=1.97.

Figure 5C:
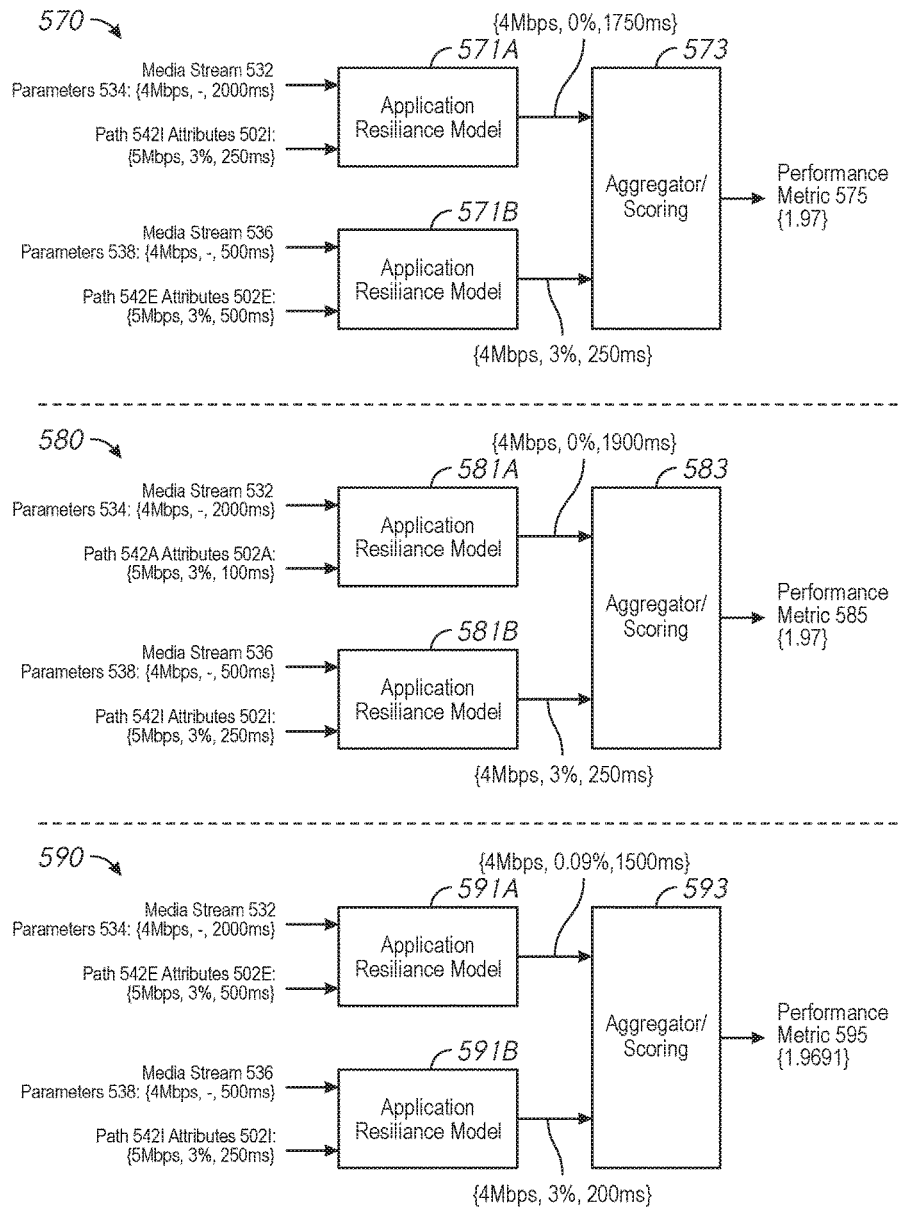

FIG. 5C illustrates a block diagram of a modeling workflow for a fourth scenario 570 of path-stream pairings in accordance with various implementations. In the scenario 570, the media stream 532 is matched to the path 542I (pairing 1), and the media stream 536 is matched to the path 542E (pairing 2). With respect to pairing 1 of the scenario 570, $R_{floor}$=3, $L_{Res}$=8.1E-7%, and $D_{Retrans}$=1750 ms. As such, the intermediate results₁ from application resilience block 571A correspond to {4 Mbps, 8.1E-7%, 1750 ms}. With respect to pairing 2 of the scenario 570, $R_{floor}$=0, $L_{Res}$=3%, and $D_{Retrans}$=500 ms. As such, the intermediate results₂ from the application resilience block 571B correspond to {4 Mbps, 3%, 500 ms}.

According to some implementations, the scenario 570 is assigned a performance metric 575 (sometimes also referred to herein as the "performance score") whereby the intermediate results from the application resilience blocks 571A and 571B are provided to the aggregator block 573. As a result, based on equation (4), the performance metric 575=1.97.

FIG. 5C also illustrates a block diagram of a modeling workflow for a fifth scenario 580 of path-stream pairings in accordance with various implementations. In the scenario 580, the media stream 532 is matched to the path 542A (pairing 1), and the media stream 536 is matched to the path 542I (pairing 2). With respect to pairing 1 of the scenario 580, $R_{floor}$=9, $L_{Res}$=5.905E-16%, and $D_{Retrans}$=1900 ms. As such, the intermediate results₁ from application resilience block 581A correspond to {4 Mbps, 5.905E-16%, 1900 ms}. With respect to pairing 2 of the scenario 580, $R_{floor}$=0, $L_{Res}$=3%, and $D_{Retrans}$=250 ms. As such, the intermediate results₂ from the application resilience block 581B correspond to {4 Mbps, 3%, 250 ms}.

According to some implementations, the scenario 580 is assigned a performance metric 585 (sometimes also referred to herein as the "performance score") whereby the intermediate results from the application resilience blocks 581A and 581B are provided to the aggregator block 583. As a result, based on equation (4), the performance metric 585=1.97.

FIG. 5C further illustrates a block diagram of a modeling workflow for a sixth scenario 590 of path-stream pairings in accordance with various implementations. In the scenario 590, the media stream 532 is matched to the path 542E (pairing 1), and the media stream 536 is matched to the path 542I (pairing 2). With respect to pairing 1 of the scenario 590, $R_{floor}$=1, $L_{Res}$=0.09%, and $D_{Retrans}$=1500 ms. As such, the intermediate results₁ from application resilience block 591A correspond to {4 Mbps, 0.09%, 1500 ms}. With respect to pairing 2 of the scenario 590, $R_{floor}$=0, $L_{Res}$=3%, and $D_{Retrans}$=250 ms. As such, the intermediate results$_2$ from the application resilience block 591B correspond to {4 Mbps, 3%, 250 ms}.

According to some implementations, the scenario 590 is assigned a performance metric 595 (sometimes also referred to herein as the "performance score") whereby the intermediate results from the application resilience blocks 591A and 591B are provided to the aggregator block 593. As a result, based on equation (4), the performance metric 595=1.9691.

In this example, the performance metric 555 is greater than the performance metrics 535, 565, 575, 585, and 595. Thus, the device (e.g., the controller 120, one of the client devices 102 or 112, one of the gateway devices 152 or 172, or a combination thereof, FIGS. 1A-1B) coordinates transmission of the media stream according to the path-stream pairing in the scenario 550, where the media stream 532 is transmitted via the path 542I, and the media stream 536 is transmitted via the path 542A.

Figure 6:
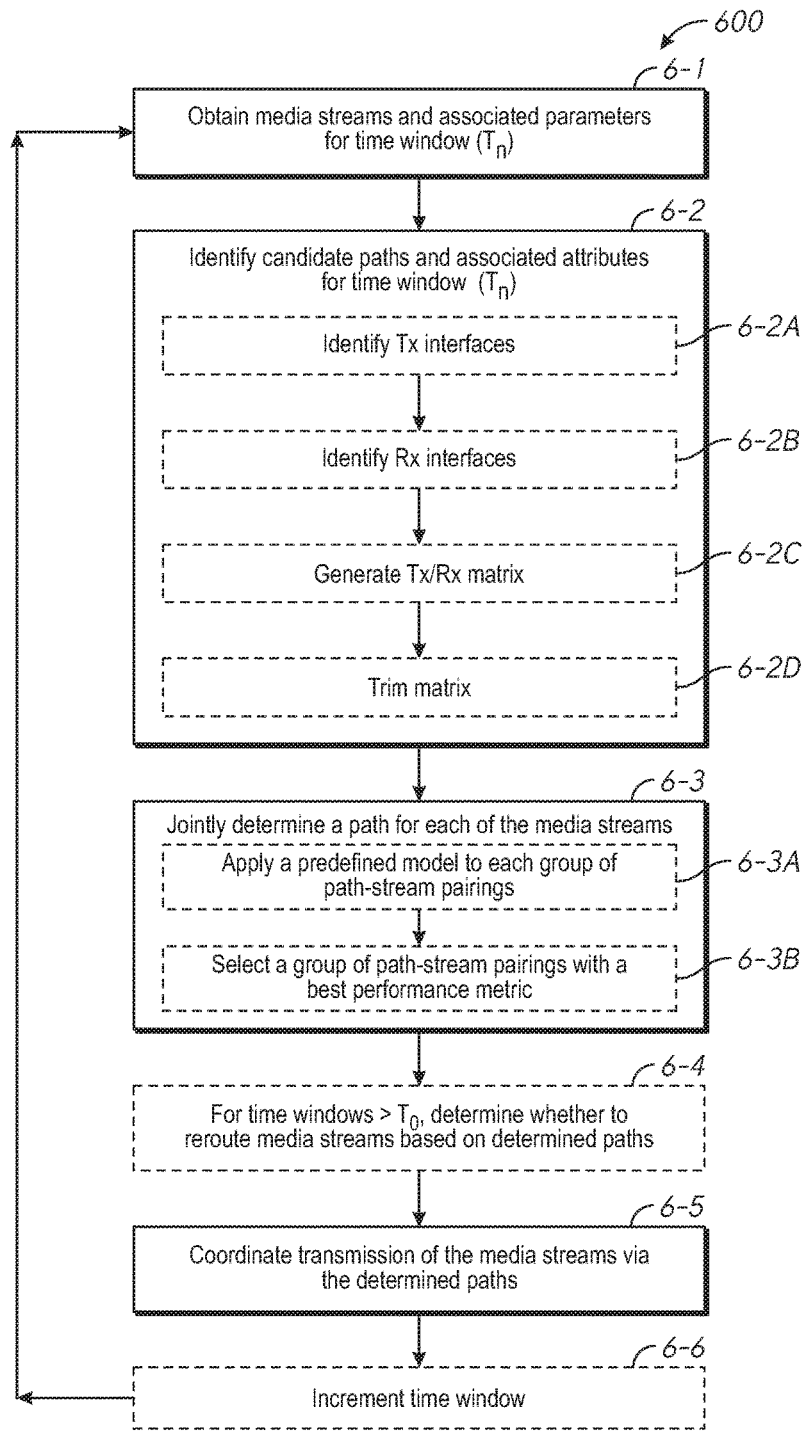
FIG. 6 is a flowchart representation of a method of jointly determining path-stream pairings in accordance with some implementations.

FIG. 6 is a flowchart representation of a method 600 of jointly determining path-stream pairings in accordance with some implementations. In various implementations, the method 600 is performed by a device (e.g., the device 700 in FIG. 7). As one example, the device corresponds to a controller (e.g., the controller 120 in FIGS. 1A-1B). In another example, the device corresponds to a client device (e.g., a receiving or transmitting device such as one of the client devices 102 or 112 in FIG. 1A). In yet another example, the device corresponds to a gateway device (e.g., one of the gateway devices 152 or 152 in FIG. 1B). Briefly, in some circumstances, the method 600 includes: obtaining media streams and associated parameters; identifying candidate paths and associated attributes; jointly determining a path from among the candidate paths for each of the media streams; and coordinating transmission of the media streams via the jointly determined paths.

In some implementations, the method 600 is performed by an intelligence layer such as a common conferencing application (e.g., the controller 120 in FIGS. 1A-1B). In some implementations, the method 600 is performed by a server or client of the conferencing application (e.g., one of the client devices 102 or 112 in FIG. 1A). In some implementations, the method 600 is performed by a media gateway (e.g., one of the gateway devices 152 or 172 in FIG. 1B).

As represented by block 6-1, the method 600 includes obtaining media streams and associated parameters for a time window ($T_n$). In some implementations, the device or a component thereof (e.g., the obtaining module 730, FIG. 7) obtains (e.g., receives, retrieves, or detects) a plurality of media streams for transmission from a transmitting device to a receiving device. For example, with reference to FIG. 1A, the controller 120 obtains or detects the plurality of media streams (e.g., a video stream and a presentation stream for a videoconference) for transmission from the first client device 102 to the second client device 112.

In some implementations, the device or a component thereof (e.g., the obtaining module 730, FIG. 7) determines a set of stream parameters for each of the plurality of media streams for the time window ($T_n$). According to some implementations, for the time window ($T_n$), each of the media streams is associated with a set of stream parameters that includes at least one of a bit-rate or bandwidth tolerance, a loss-rate tolerance, a delay tolerance or delay variation, tolerance of packet loss burst patterns (e.g., less than 3 consecutive packet losses), non-linear mapping functions from rate, loss, and/or delay values to performance score, or the like.

As one example, with reference to FIG. 2A, the first media stream 232 is characterized by a set of stream parameters 234 that includes: a rate value ($R_{234}$) of 4 Mbps and a delay value ($D_{234}$) of 2000 ms. Similarly, continuing with this example, the second media stream 236 is characterized by a set of stream parameters 238 that includes: a rate value ($R_{238}$) of 4 Mbps and a delay value ($D_{238}$) of 500 ms. In this example, the first media stream 232 corresponds to a presentation stream, such as a slideshow, with a high delay tolerance (e.g., 2000 ms), and the second media stream 236 corresponds to a video stream with a low delay tolerance (e.g., 500 ms).

As represented by block 6-2, the method 600 includes identifying candidate paths and associated attributed for the time window ($T_n$). In some implementations, the device or a component thereof (e.g., the path discovery module 732, FIG. 7) determines a plurality of candidate paths for transmission of the plurality of media streams from the transmitting device to the receiving device. For example, with reference to FIG. 1A, the controller 120 performs a path discovery process to determines candidate paths from the first client device 102 (e.g., the transmitting device) to the second client device 112 (e.g., the receiving device). According to some implementations, the candidate paths are based on the interfaces 104A and 104B (e.g., WiFi and 3G interfaces, respectively) of the first client device 102 (e.g., the transmitting device) and the interfaces 114A and 114B (e.g., WiFi and 3G interfaces, respectively) of the second client device 112 (e.g., the receiving device). According to some implementations, the candidate paths are based on the communication links 122A and 122B (e.g., active WiFi and 3G connections, respectively) associated with the first client device 102 (e.g., the transmitting device) and the communication links 124A and 124B (e.g., active WiFi and 3G connections, respectively) associated with the second client device 112 (e.g., the receiving device).

In some implementations, the device or a component thereof (e.g., the path discovery module 732, FIG. 7) determines a set of performance attributes for each of the candidate paths for the time window ($T_n$). According to some implementations, for the time window ($T_n$), each of the candidate paths is associated with a set of performance attributes that includes at least one of an available bandwidth, a bit-rate value, a loss-rate, a delay, delay jitter, error characteristic (e.g., isolated or clustered), or the like. In some embodiments, the set of performance attributes network also includes a Quality of Service (QoS) (or priority marking), for example, a network may allow certain percentage of packets to be marked high priority. In some embodiments, each of the candidate paths is associated with a cost, for example, corresponding to a data quota for the candidate path.

As one example, with reference to FIG. 2A, the path 242A is characterized by a set of performance attributes 202A that includes: a rate value ($R_{AA}$) of 5 Mbps, a loss value ($L_{AA}$) of 3%, and a delay value ($D_{AA}$) of 100 ms. Similarly, continuing with this example, the path 242D is characterized by a set of performance attributes 202D that includes: a rate value ($R_{BB}$) of 5 Mbps, a loss value ($L_{BB}$) of 3%, and a delay value ($D_{BB}$) of 500 ms. In this example, the path 242A corresponds to a WiFi network with a low delay (e.g., 100 ms), and the path 242D corresponds to a 3G network with a higher delay (e.g., 500 ms).

As shown in FIG. 2A, the performance attributes are constant numbers for ease of explanation. However, as will appreciated by one of ordinary skill in the art, in various other implementations, the performance attributes are interdependent and/or variable. As one example, a home cable modem has low delay when the transmitted data rate is low, but over a congestion threshold the cable modem has a high delay. Furthermore, network delay, loss, etc. in general are time-varying.

In some implementations, as represented by block 6-2A, the method 600 optionally includes identifying transmission (Tx) interfaces. In some implementations, the device or a component thereof (e.g., the path discovery module 732, FIG. 7) identifies the communication interfaces of the transmitting device (e.g., the Tx interfaces). For example, with reference to FIG. 1A, the controller 120 performs a path discovery process to identify the interfaces 104A and 104B (e.g., WiFi and 3G interfaces, respectively) of the first client device 102 (e.g., the transmitting device). For example, with reference to FIGS. 5A-5C, the Tx/Rx matrix 500 includes three rows: a first row associated with Tx interface 504A (e.g., corresponding to a WiFi connection of the transmitting device), a second row associated with Tx interface 504B (e.g., corresponding to a 3G connection of the transmitting device), and a third row associated with Tx interface 504C (e.g., corresponding to another connection of the transmitting device).

In some implementations, as represented by block 6-2B, the method 600 optionally includes identifying reception (Rx) interfaces. In some implementations, the device or a component thereof (e.g., the path discovery module 732, FIG. 7) identifies the communication interfaces of the receiving device (e.g., the Rx interfaces). For example, with reference to FIG. 1A, the controller 120 performs a path discovery process to identify the interfaces 114A and 114B (e.g., WiFi and 3G interfaces, respectively) of the second client device 112 (e.g., the receiving device). For example, with reference to FIGS. 5A-5C, the Tx/Rx matrix 500 includes three columns: a first column associated with Rx interface 506A (e.g., corresponding to a WiFi connection of the receiving device), a second row associated with Rx interface 506B (e.g., corresponding to a 3G connection of the receiving device), and a third row associated with Rx interface 506C (e.g., corresponding to another connection of the receiving device).

In some implementations, as represented by block 6-2C, the method 600 optionally includes generating a Tx/Rx matrix. In some implementations, the device or a component thereof (e.g., the path discovery module 732, FIG. 7) generates a Tx/Rx matrix based on the Tx interfaces identified in block 6-2A and the Rx interfaces identified in block 6-2B. According to some implementations, the Tx/Rx matrix is an N×M matrix. As such, in some implementations, the number of Rx and Tx interfaces is unequal. As such, in some implementations, the number of Rx and Tx interfaces is equal. In some implementations, the sending and/or receiving party has multiple available networks/channels/paths. As such, in some implementations, assuming the method is performed by the transmitting device/gateway, an N×M matrix of Tx/Rx interfaces is generated using a priori knowledge of the Tx interfaces and a discovery protocol, such as STUN (session traversal utilities for NAT), for the Rx interfaces. In some implementations, a controller determines the N×M matrix of Tx/Rx interfaces via the Internet control message protocol (ICMP), the simple network management protocol (SNMP), or the like.

In some implementations, as represented by block 6-2D, the method 600 optionally includes trimming the Tx/Rx matrix. In some implementations, the device or a component thereof (e.g., the path discovery module 732, FIG. 7) trims the Tx/Rx matrix according to a predefined set of criteria or a predefined policy. According to some implementations, the Tx/Rx matrix is reduced from an N×M matrix to an (N−a)×(M−b) matrix (e.g., a sub-matrix of the original Tx/Rx matrix). According to some implementations, candidate paths with orthogonal connection modalities are disregarded. For example, with reference to FIGS. 2A-2B, as the path 242B (e.g., associated with a WiFi Tx interface and a 3G Rx interface) and the path 242C (e.g., associated with a 3G Rx interface and a WiFi Tx interface) are not included among the candidate paths. According to some implementations, candidate paths with insufficient bandwidth are disregarded. According to some implementations, candidate paths that are associated with one or more reserved or disabled interfaces are disregarded. In some implementations, candidate paths that are disregarded based on a usage policy that takes into account the usage or cost of each candidate path based on a data plan of the user.

As represented by block 6-3, the method 600 includes jointly determining a path for each of the media streams. In some implementations, the best path for each of the media streams is determined jointly (e.g., simultaneously or in concert). In some implementations, the device or a component thereof (e.g., the determining module 740, FIG. 7) jointly determines a path from among the candidate paths for each of the plurality of media streams. In some implementations, a first count of the plurality of candidate paths and a second count of the plurality of media streams are equal. For example, in FIGS. 2A-2B, the number of candidate paths (e.g., 242A and 242D) is equal to the number of media streams (e.g., 232 and 236). In some implementations, a first count of the plurality of candidate paths and a second count of the plurality of media streams are unequal. For example, in FIGS. 5A-5C, the number of candidate paths (e.g., 542A, 542E, and 542I) is greater than the number of media streams (e.g., 532 and 536). In another example, in FIGS. 4A-4B, the number of candidate paths (e.g., 442A and 442D) is less than the number of media streams (e.g., 432, 436, and 440).

In some implementations, as represented by block 6-3A, the method 600 optionally includes applying a predefined model to each group of path-stream pairings. In some implementations, the device or a component thereof (e.g., the modeling unit 742, FIG. 7) performs a predefined model on each group of path-stream pairings. According to some implementations, the predefined model determines a performance metric for each group of path-stream pairings using the sets of stream parameters for each of the plurality of media streams and the sets of performance attributes for each of the candidate paths as inputs to the model.

For example, the predefined model is a retransmission model (e.g., as shown in FIGS. 2A-2B, 4A-4B, and 5A-5C). In another example, the predefined model is an error correction model (e.g., as shown in FIGS. 3A-3B). In yet another example, the predefined model is a hybrid of the retransmission and error correction models. In yet another example, the predefined model corresponds to a Quality of Service (QoS) (or priority marking) model, for example, a network may allow certain percentage of packets to be marked high priority. According to some implementations, those of ordinary skill in the art will appreciate from the present disclosure that other models may be used to jointly determine a path from among the candidate paths for each of the plurality of media streams. In yet another example, the predefined model corresponds to error concealment methods that can be used in conjunction with error correction. In yet another example, the predefined model corresponds to a non-linear mapping between a given residual packet loss rate to a degraded performance score. Furthermore, in some implementations, the workflow block diagrams shown in FIGS. 2A-2B, 3A-3B, 4A-4B, and 5A-5C are non-limiting examples for the application of the retransmission and error correction models and that various other implementations may include modified workflows for the application of the retransmission and error correction models.

As one example, with reference to FIGS. 2A-2B, the device jointly determines a best group of path-stream pairings by applying each of the potential path-stream pairings to a retransmission model that seeks to minimize residual loss rates. In this example, the first group of path-stream pairings corresponds to the scenario 230, where the media stream 232 is matched to the path 242A (pairing 1), and the media stream 236 is matched to the path 242D (pairing 2). Continuing with this example, the second group of path-stream pairings corresponds to the scenario 250, where the media stream 232 is matched to the path 242D (pairing 1), and the media stream 236 is matched to the path 242A (pairing 2)

According to some implementations, the device generates intermediate results for each of the path-stream pairings 1 and 2 in the first group by determining a number of possible retransmissions for each of the for each of the path-stream pairings based on equation (1) described above with reference to FIG. 2B, a residual loss rate for each of the for each of the path-stream pairings based on equation (2) described above with reference to FIG. 2B, and a retransmission delay for each of the for each of the path-stream pairings based on the equation (3) described above with reference to FIG. 2B. According to some implementations, the first group of path-stream pairings is assigned a performance score (e.g., the performance metric 235 in FIG. 2B) based on the intermediate results for each of the path-stream pairings 1 and 2 in the first group. Similarly, the second group of path-stream pairings is assigned a performance score (e.g., the performance metric 255 in FIG. 2B) based on the intermediate results for each of the path-stream pairings 1 and 2 in the second group. According to some embodiments, the modeling diagrams in FIG. 2B may also have an outer loop that, for example, adjusts the stream rate values and re-evaluates the scenarios.

With respect to pairing 1 of the scenario 230 in FIG. 2B, $R_{floor}=9$, $L_{Res}=5.905E-16\%$, and $D_{Retrans}=1900$ ms. As such, the intermediate results$_1$ from application resilience block 431A corresponds to {4 Mbps, 5.905E-16%, 1900 ms}. With respect to pairing 2 of the scenario 430, $R_{floor}=1$, $L_{Res}=0.09\%$, and $D_{Retrans}=300$ ms. As such, the intermediate results$_2$ from the application resilience block 431B corresponds to {4 Mbps, 0.09%, 300 ms}. With respect to pairing 3 of the scenario 430, $R_{floor}=0$, $L_{Res}=3\%$, and $D_{Retrans}=500$ ms. As such, the intermediate results$_3$ from the application resilience block 431C corresponds to {4 Mbps, 3%, 500 ms}. According to some implementations, the scenario 230 is assigned a performance metric 235 (sometimes also referred to herein as the "performance score") whereby the intermediate results from the application resilience blocks 231A and 231B are provided to the aggregator block 233. As a result, based on equation (4), the performance metric 235=1.97.

With respect to pairing 1 of the scenario 250 in FIG. 2B, $R_{floor}=1$, $L_{Res}=0.09\%$, and $D_{Retrans}=1500$ ms. As such, the intermediate results$_1$ from application resilience block 251A correspond to {2 Mbps, 0.09%, 1500 ms}. With respect to pairing 2 of the scenario 250, $R_{floor}=2$, $L_{Res}=0.0027\%$, and $D_{Retrans}=500$ ms. As such, the intermediate results$_2$ from the application resilience block 251B correspond to {2 Mbps, 0.0027%, 500 ms}. According to some implementations, the scenario 250 is assigned a performance metric 255 (sometimes also referred to herein as the "performance score") whereby the intermediate results from the application resilience blocks 251A and 251B are provided to the aggregator block 253. As a result, based on equation (4), the performance metric 255=1.991.

In some implementations, as represented by block 6-3B, the method 600 optionally includes selecting a group of path-stream pairings with a best performance metric. In some implementations, the device or a component thereof (e.g., the selecting unit 744, FIG. 7) selects the group of path-stream pairings with the best performance based on the results from block 6-3a. Continuing with the example in block 6-3A, with reference to FIGS. 2A-2B, the performance metric 255 corresponds to a higher performance metric (e.g., 1.991) than the performance metric 235 (e.g., 1.97). Thus, the device or the component thereof (e.g., the selecting unit 744, FIG. 7) selects the group of path-stream pairings associated with the scenario 250, where the media stream 232 is matched to the path 242D (pairing 1), and the media stream 236 is matched to the path 242A (pairing 2).

In some implementations, as represented by block 6-4, the method 600 optionally includes determining whether to reroute the media streams based on the determined path for time windows after $T_0$. According to some implementations, the device monitors the performance attributes of the candidate paths according to a predefined time window or sampling period. As such, the device monitors the candidate paths for changing conditions and/or demands. For example, the device samples the attributes for the paths for the current time period, as conditions may have changed, and determines whether a better path exists for the media streams.

In some implementations, assuming that the current time period is after $T_0$, the device or a component thereof (e.g., the determining module 740, FIG. 7) determines whether to change from the current paths of the plurality of the media streams determined for a previous time period ($T_{n-1}$) to the paths determined for a current time period ($T_n$) for each of the plurality of the media streams based on the performance attributes for the current time period ($T_n$). In some implementations, the device changes the paths for the plurality of streams if the performance metric for the current time period ($T_n$) satisfies a threshold improvement value in comparison to the performance metric for the previous time period ($T_{n-1}$). For example, threshold improvement value is satisfied when the performance metric for the current time period ($T_n$) is X % less than the performance metric for the previous time period ($T_{n-1}$). In another example, threshold improvement value is satisfied when the performance metric for the current time period ($T_n$) is Y % greater than the performance metric for the previous time period ($T_{n-1}$).

As represented by block 6-5, the method 600 includes coordinating the media streams via the determined paths. In some implementations, the device or a component thereof (e.g., the coordinating module 748, FIG. 7) coordinates transmission of the plurality of media streams via the paths determined in block 6-3. Continuing with the example in block 6-3B, with reference to FIGS. 2A-2B, the device or a component thereof (e.g., the coordinating module 748, FIG. 7) coordinates transmission of the media streams according to the path-stream pairing in the scenario 250, where the media stream 232 is transmitted via the path 242D, and the media stream 236 is transmitted to the path 242A.

In some implementations, as represented by block 6-6, the method 600 optionally includes incrementing the time window. In some implementations, the device or a component thereof increments the time window from $T_n$ to $T_{n+1}$, and method 600 continues at block 6-1 for the time window $T_{n+1}$.

Figure 7:
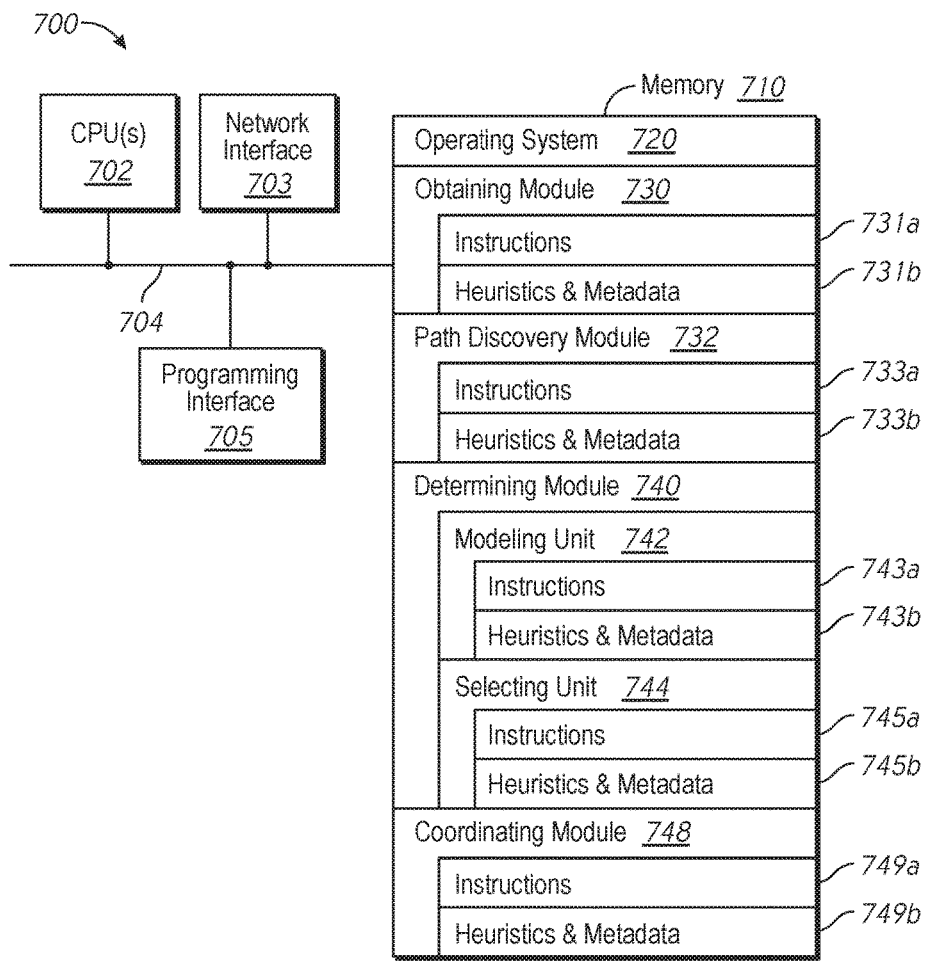
FIG. 7 is a block diagram of an example device in accordance with some implementations.

FIG. 7 is a block diagram of an example of a device 700 in accordance with some implementations. For example, in some implementations, the device 700 is similar to and adapted from the controller 120 in FIGS. 1A-1B. For example, in some implementations, the device 700 is similar to and adapted from the client devices 102 and 112 in FIG. 1A. For example, in some implementations, the device 700 is similar to and adapted from the gateway devices 152 and 172 in FIG. 1B. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units (CPUs) 702, a network interface 703, a memory 710, a programming (I/O) interface 705, and one or more communication buses 704 for interconnecting these and various other components.

In some implementations, the one or more communication buses 704 include circuitry that interconnects and controls communications between system components. The memory 710 includes high-speed random access memory, such as DRAM, SRAM, DDR RAM, or other random access solid state memory devices. In some implementations, the memory 710 includes non-volatile memory, such as one or more magnetic disk storage devices, optical disk storage devices, flash memory devices, or other non-volatile solid state storage devices. The memory 710 optionally includes one or more storage devices remotely located from the one or more CPUs 702. The memory 710 comprises a non-transitory computer readable storage medium. In some implementations, the memory 710 or the non-transitory computer readable storage medium of the memory 710 stores the following programs, modules and data structures, or a subset thereof including an optional operating system 720, an obtaining module 730, a path discovery module 732, a determining module 740, and a coordinating module 750.

The operating system 720 includes procedures for handling various basic system services and for performing hardware dependent tasks.

In some implementations, the obtaining module 730 is configured to obtain or detect a plurality of media streams for transmission from a transmitting device to a receiving device. To that end, in various implementations, the obtaining module 730 includes instructions and/or logic 731*a*, and heuristics and metadata 731*b*.

In some implementations, the path discovery module 732 is configured to determine a plurality of candidate paths for transmission of the plurality of media streams from the transmitting device to the receiving device. According to some implementations, the path discovery module 732 generates a Tx/Rx matrix based on identified Tx and Rx interfaces. To that end, in various implementations, the path discovery module 732 includes instructions and/or logic 733*a*, and heuristics and metadata 733*b*.

In some implementations, the determining module 740 is configured to jointly determine a path from among the candidate paths for each of the plurality of media streams. In some implementations, the determining module 740 includes a modeling unit 742 and a selecting unit 744.

In some implementations, the modeling unit 742 is configured to perform a predefined model on each group of path-stream pairings. To that end, in various implementations, the modeling unit 742 includes instructions and/or logic 743*a*, and heuristics and metadata 743*b*.

In some implementations, the selecting unit 744 is configured to select the group of path-stream pairings with the best performance based on the results from the modeling unit 742. To that end, in various implementations, the selecting unit 744 includes instructions and/or logic 745*a*, and heuristics and metadata 745*b*.

In some implementations, the coordinating module 748 is configured to coordinate transmission of the plurality of media streams via the paths determined by the determining module 740. To that end, in various implementations, the coordinating module 748 includes instructions and/or logic 749*a*, and heuristics and metadata 749*b*.

Although the obtaining module 730, the path discovery module 732, the determining module 740, and the coordinating module 750 are illustrated as residing on a single device (i.e., the device 700), it should be understood that in other implementations, any combination of the obtaining module 730, the path discovery module 732, the determining module 740, and the coordinating module 750 reside on a separate device.

Moreover, FIG. 7 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first interface could be termed a second interface, and, similarly, a second interface could be termed a first interface, which changing the meaning of the description, so long as all occurrences of the "first interface" are renamed consistently and all occurrences of the "second interface" are renamed consistently. The first interface and the second interface are both interfaces, but they are not the same interface.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device with one or more processors and non-transitory memory:
        determining a plurality of candidate paths for a plurality of media streams, wherein each of the candidate paths is characterized by a first set of performance attributes and each of the plurality of media streams is characterized by a set of stream parameters, wherein a respective first set of performance attributes for a respective candidate path of the plurality of candidate paths includes at least one of a bandwidth measurement, a loss-rate, or a delay of the respective candidate path for a first time window and a respective set of stream parameters for a respective media stream of the plurality of media streams includes at least one of a bit-rate tolerance, a loss-rate tolerance, or a delay tolerance of the respective media stream;
        jointly determining, for each of the plurality of media streams, a respective path from among the plurality of candidate paths that satisfies the set of stream parameters based on the first set of performance attributes;
        coordinating transmission of each of the plurality of media streams via the respective path for each of the plurality of media streams from a transmission interface of the respective path to a reception interface of the respective path;
        determining a second set of performance attributes for each of the plurality of candidate paths for a next second time window; and
        determining whether to change the respective paths for the plurality of the media streams based on the set of stream parameters for each of the plurality of the media streams and the second set of performance attributes for the next second time window for each of the plurality candidate paths.

2. The method of claim 1, wherein jointly determining the respective path from among the plurality of candidate paths includes performing a statistical model on each respective combination between the plurality of media streams and the plurality of candidate paths.

3. The method of claim 2, wherein the predefined model corresponds to retransmission of the plurality of media streams or error correction of the plurality of media streams.

4. The method of claim 1, wherein determining the plurality of candidate paths for media transport includes determining an N×M matrix of candidate paths, wherein N corresponds to a count of transmission interfaces for the plurality of media streams and M corresponds to a count of reception interfaces for the plurality of media streams.

5. The method of claim 4, wherein determining the N×M matrix of candidate paths includes trimming unusable paths from the N×M matrix of candidate paths to identify an (N−a)×(M−b) matrix of usable candidate paths, wherein a corresponds to a count of unusable transmission interfaces for the plurality of media streams and b corresponds to a count of unusable reception interfaces for the plurality of media streams.

6. The method of claim 4, wherein determining the N×M matrix of candidate paths includes trimming unusable paths from the N×M matrix of candidate paths to identify a sub-matrix of usable candidate paths.

7. A device comprising:
    one or more processors;
    a non-transitory memory; and
    one or more programs stored in the non-transitory, which, when executed by the one or more processors, cause the device to:
        determine a plurality of candidate paths for a plurality of media streams, wherein each of the candidate paths is characterized by a first set of performance attributes and each of the plurality of media streams is characterized by a set of stream parameters, wherein a respective first set of performance attributes for a respective candidate path of the plurality of candidate paths includes at least one of a bandwidth measurement, a loss-rate, or a delay of the respective candidate path for a first time window and a respective set of stream parameters for a respective media stream of the plurality of media streams includes at least one of a bit-rate tolerance, a loss-rate tolerance, or a delay tolerance of the respective media stream;
        jointly determine, for each of the plurality of media streams, a respective path from among the plurality of candidate paths that satisfies the set of stream parameters based on the first set of performance attributes;
        coordinate transmission of each of the plurality of media streams via the respective path for each of the plurality of media streams from a transmission interface of the respective path to a reception interface of the respective path;
        determine a second set of performance attributes for each of the plurality of candidate paths for a next time window; and
        determine whether to change the respective paths for the plurality of the media streams based on the set of stream parameters for each of the plurality of the media streams and the second set of performance attributes for the next time window for each of the plurality candidate paths.

8. The device of claim 7, wherein jointly determining the respective path from among the plurality of candidate paths includes performing a statistical model on each respective combination between the plurality of media streams and the plurality of candidate paths.

9. The device of claim 7, wherein determining the plurality of candidate paths for media transport includes determining an N×M matrix of candidate paths, wherein N corresponds to a count of transmission interfaces for the plurality of media streams and M corresponds to a count of reception interfaces for the plurality of media streams.

10. The device of claim 9, wherein determining the N×M matrix of candidate paths includes trimming unusable paths from the N×M matrix of candidate paths to identify an (N−a)×(M−b) matrix of usable candidate paths, wherein a corresponds to a count of unusable transmission interfaces for the plurality of media streams and b corresponds to a count of unusable reception interfaces for the plurality of media streams.

11. A non-transitory memory storing one or more programs, the one or more programs comprising instructions, which, when executed by one or more processors of a device, cause the device to:

determine a plurality of candidate paths for a plurality of media streams, wherein each of the candidate paths is characterized by a first set of performance attributes and each of the plurality of media streams is characterized by a set of stream parameters, wherein a respective first set of performance attributes for a respective candidate path of the plurality of candidate paths includes at least one of a bandwidth measurement, a loss-rate, or a delay of the respective candidate path for a first time window and a respective set of stream parameters for a respective media stream of the plurality of media streams includes at least one of a bit-rate tolerance, a loss-rate tolerance, or a delay tolerance of the respective media stream;

jointly determine, for each of the plurality of media streams, a respective path from among the plurality of candidate paths that satisfies the set of stream parameters based on the first set of performance attributes;

coordinate transmission of each of the plurality of media streams via the respective path for each of the plurality of media streams from a transmission interface of the respective path to a reception interface of the respective path;

determine a second set of performance attributes for each of the plurality of candidate paths for a next time window; and determine whether to change the respective paths for the plurality of the media streams based on the set of stream parameters for each of the plurality of the media streams and the second set of performance attributes for the next time window for each of the plurality candidate paths.

12. The non-transitory memory of claim 11, wherein jointly determining the respective path from among the plurality of candidate paths includes performing a statistical model on each respective combination between the plurality of media streams and the plurality of candidate paths.

13. The non-transitory memory of claim 11, wherein determining the plurality of candidate paths for media transport includes determining an N×M matrix of candidate paths, wherein N corresponds to a count of transmission interfaces for the plurality of media streams and M corresponds to a count of reception interfaces for the plurality of media streams.

* * * * *